United States Patent
Gray et al.

(10) Patent No.: US 9,292,739 B1
(45) Date of Patent: Mar. 22, 2016

(54) AUTOMATED RECOGNITION OF TEXT UTILIZING MULTIPLE IMAGES

(71) Applicant: A9.com, Inc., Palo Alto, CA (US)

(72) Inventors: Douglas Ryan Gray, Mountain View, CA (US); Colin Jay Taylor, Orinda, CA (US); Xiaofan Lin, Palo Alto, CA (US); Adam Wiggen Kraft, Mountain View, CA (US); Yu Lou, Stanford, CA (US); Arnab Sanat Kumar Dhua, Mountain View, CA (US)

(73) Assignee: A9.com, Inc., Palo Alto, CA (US)

( * ) Notice: Subject to any disclaimer, the term of this patent is extended or adjusted under 35 U.S.C. 154(b) by 126 days.

(21) Appl. No.: 14/105,084

(22) Filed: Dec. 12, 2013

(51) Int. Cl.
  *G06K 9/46* (2006.01)
  *G06K 9/00* (2006.01)

(52) U.S. Cl.
  CPC .................................. *G06K 9/00456* (2013.01)

(58) Field of Classification Search
  USPC ......... 382/171, 190, 282, 284, 290, 294, 313; 358/1.11, 537, 538, 540
  See application file for complete search history.

(56) References Cited

U.S. PATENT DOCUMENTS

| | | | | |
|---|---|---|---|---|
| 6,400,845 B1 * | 6/2002 | Volino | ................. | G06K 9/2054 358/462 |
| 6,562,077 B2 * | 5/2003 | Bobrow | ............ | G06F 17/30011 382/306 |
| 6,785,405 B2 * | 8/2004 | Tuttle | ................. | G06K 9/00442 340/5.86 |
| 7,499,588 B2 * | 3/2009 | Jacobs | ............... | G06K 9/00463 382/173 |
| 7,779,355 B1 * | 8/2010 | Erol et al. | ...................... | 715/273 |
| 7,787,712 B2 * | 8/2010 | Takahashi et al. | ............ | 382/305 |
| 7,802,184 B1 * | 9/2010 | Battilana | ....................... | 715/257 |
| 8,111,927 B2 * | 2/2012 | Vincent | .................... | G06K 9/03 382/225 |
| 8,527,337 B1 * | 9/2013 | Lim et al. | .................... | 705/14.35 |
| 8,548,246 B2 * | 10/2013 | Al-Omari et al. | ............. | 382/185 |
| 8,588,528 B2 * | 11/2013 | Chapman et al. | ............ | 382/182 |
| 8,726,148 B1 * | 5/2014 | Battilana | ....................... | 715/234 |

* cited by examiner

*Primary Examiner* — Yosef Kassa

(57) ABSTRACT

Various embodiments enable text aggregation from multiple image frames of text. Accordingly, in order to stitch newly scanned areas of a document together, text in a respective image is recognized and analyzed using an algorithm to identify pairs of corresponding words in other images. Upon identifying a minimum number of matching pairs between two respective images, a mapping between the same can be determined based at least in part on a geometric correspondence between respective identified pairs. Based on this mapping, the recognized text of the two images can be merged by adding words of one image to the other using the matching word pairs as alignment data points.

18 Claims, 20 Drawing Sheets

To sail beyond the sunset, and the baths
Of all the western stars, until I die.
It may be that the gulfs will wash us down:
It may be we shall touch the Happy Isles, — 508c
And see the great Achilles, whom we knew — 510c
Though much is taken, much abides; and though
We are not now that strength which in old days
Moved earth and heaven; that which we are, we are;
One equal temper of heroic hearts,
Made weak by time and fate, but strong in will
To strive, to seek, to find, and not to yield.

Column 1

This is the first paragraph

What's that, you want to see more paragraphs?

Let's add a third paragraph, and maybe add some more text to this paragraph compared to those first two paragraphs Great, but now we want a fourth paragraph here in the ground there lived a Hobbit. In a hole in the ground there lived a hobbit. Not a nasty, wet hole filled with the ends of worms and an oozy smell, nor yet a dry, hare, sandy hole with nothing in it to sit down on it was a hobbit-hole, and that means comfort Column 2

More Hobbit: It had a perfectly round door like a porthole pointed green with a shiny brass knob in the exact middle. The door opened on to a tube-shaped hall like a tunnel For the record. I typed this by hand, so there are probably some errors For the rest of the story go check out the movies. There's a dragon

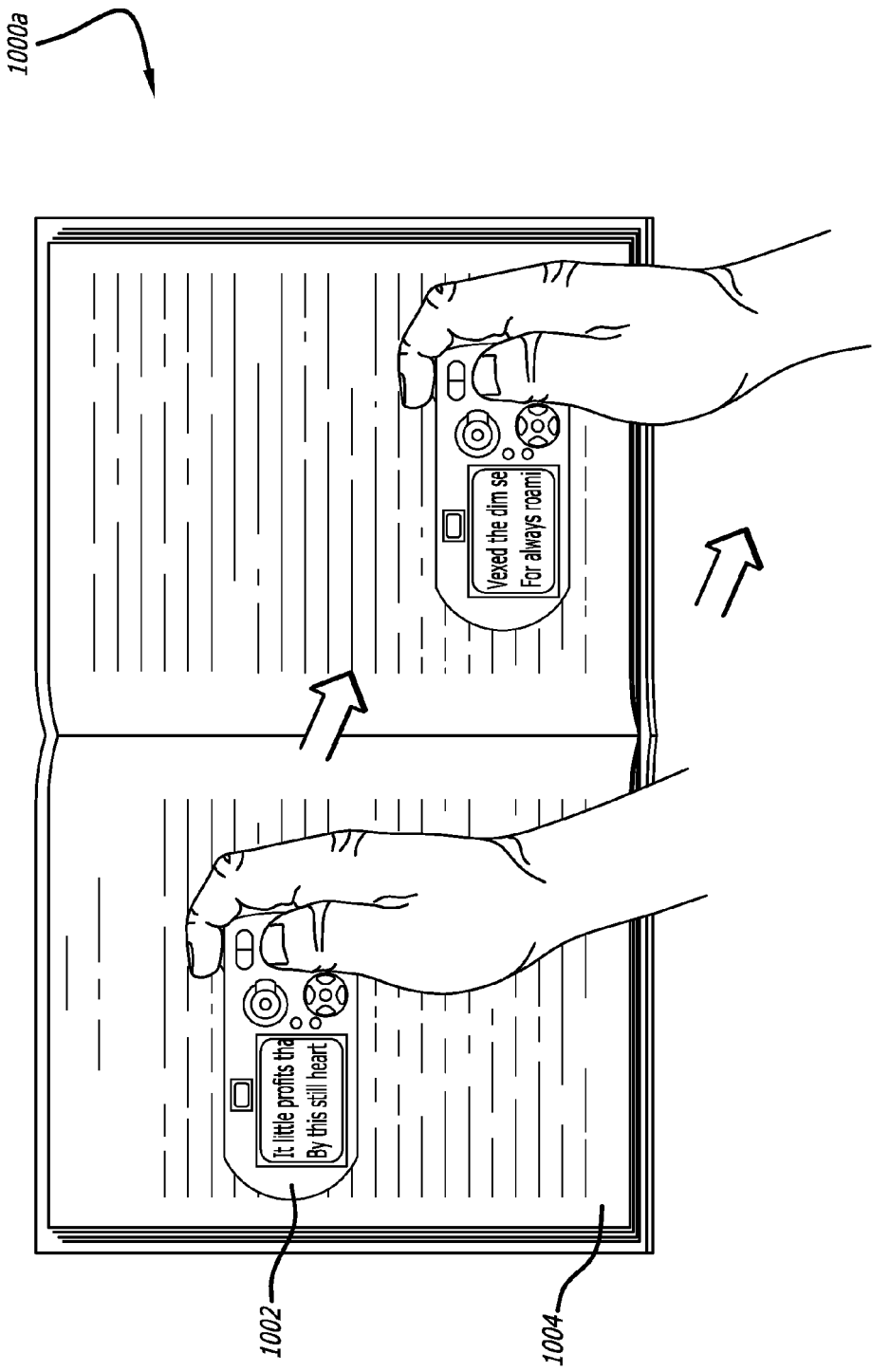

AUTOMATED RECOGNITION OF TEXT UTILIZING MULTIPLE IMAGES

BACKGROUND

Optical character recognition (OCR) systems are generally used to detect text present in an image and to convert the detected text into its equivalent electronic representation. Conventional OCR systems have relied on using a single image to detect and recognize text. Such OCR systems, when using a single image frame, often fail to recognize all text in the image as a result of poor lighting, contrast, focus conditions, and the like. Further, OCR systems typically require a minimum character size in order for the text to be properly recognized. Due to limited camera resolution, this means that many real-world documents, or other bodies of text, are too voluminous to be captured in a single image frame at a character size sufficiently large enough to be recognized by an OCR system. As technology advances and as people are increasingly using computing devices in a wider variety of ways, it can, therefore, be advantageous to adapt the ways in which text is captured, recognized, and processed using a computing device in order to enable users to capture and recognize larger bodies of text with the same.

BRIEF DESCRIPTION OF THE DRAWINGS

Various embodiments in accordance with the present disclosure will be described with reference to the drawings, in which:

FIGS. 5A, 5B, and 5C illustrate an example process showing text aggregation and refinement as multiple images of text are aggregated in accordance with at least one embodiment;

FIGS. 8A, 8B, and 8C illustrate an example visual process for detecting columns of text in accordance with at least one embodiment;

FIG. 10A illustrates an example of a user capturing image information of text from a book using a camera in accordance with at least one embodiment;

DETAILED DESCRIPTION

Figure 1A:
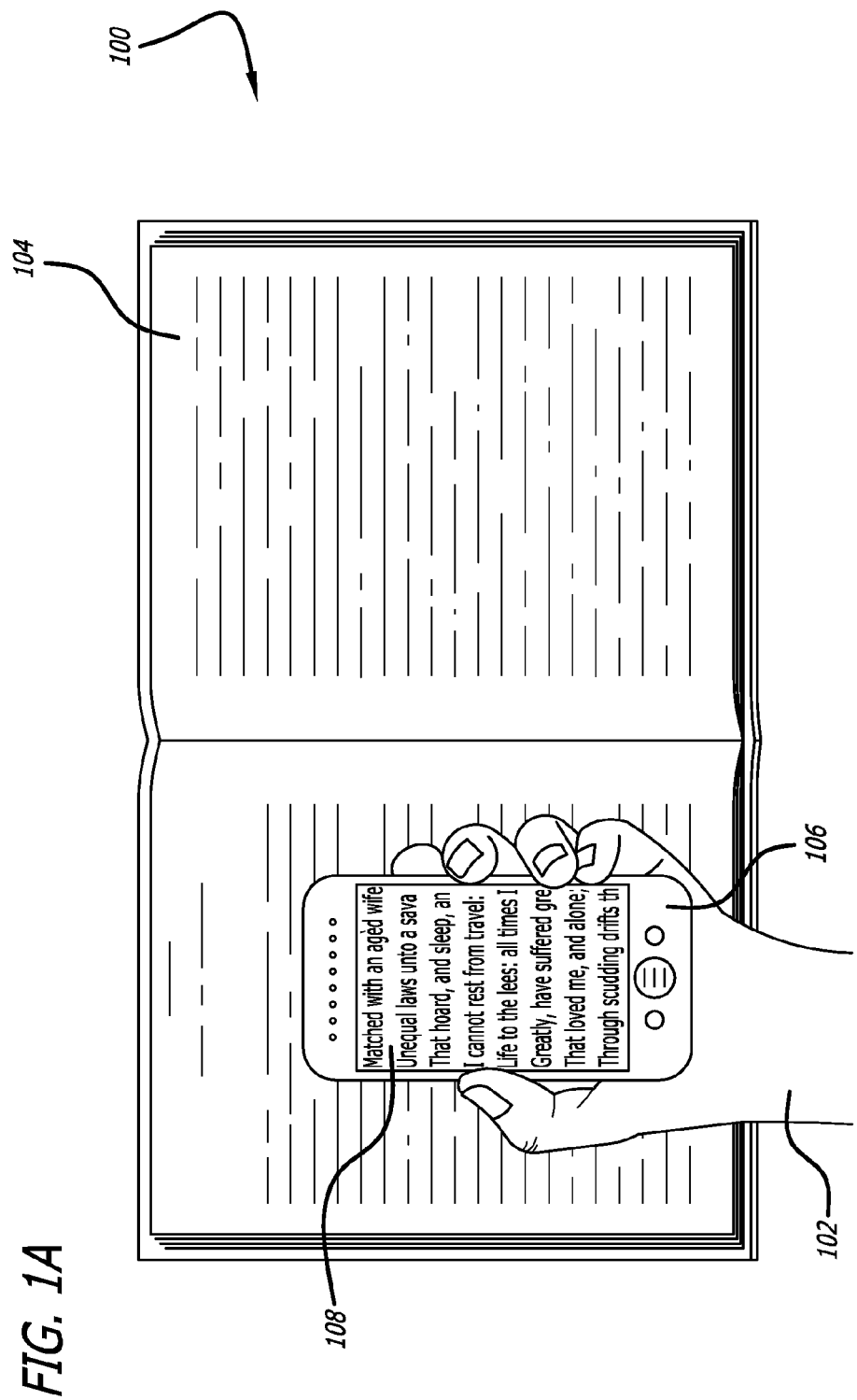
FIG. 1A illustrates an example of a user capturing a single image of text from a book using a portable computing device to, as used by conventional systems.

Systems and methods in accordance with various embodiments of the present disclosure may overcome one or more of the aforementioned and other deficiencies experienced in conventional approaches to recognizing text using a computing device. In particular, various approaches enable a computing device to track and store results from an optical character recognition (OCR) engine over time as OCR results from subsequent images are collected. These OCR results can then be aggregated together in order to piece together a larger and more accurate digital representation of a large volume of real-world text than can be captured in a single image.

As discussed herein, text aggregation uses OCR results from multiple frames (such as consecutive frames or every $n^{th}$ frame) in order to stitch together (or otherwise aggregate information from) newly scanned or captured areas of a document or other group of text, while additionally improving the accuracy of results in overlapping regions that appear in more than one image frame. In one example, while (or shortly after) the frames are being captured, text in at least one respective image is analyzed. In at least one embodiment, a text canvas (e.g., a digital representation of text) can initially be generated from OCR results of a first portion of a body of text captured in a first image. As used herein, the phrase "text canvas" refers to a digital representation (e.g., data, information, etc.) of one or more characters or glyphs corresponding to text recognized by a given OCR engine. Accordingly, text from subsequent images of different portions of the body of text can be submitted for text recognition as each subsequent image is captured. For example, recognized text from a second image, subsequent to the first image, corresponding to a second portion of the body of text can be analyzed using an algorithm (e.g., a RANdom SAmple Consensus (RANSAC) algorithm, etc.) to identify pairs of corresponding words in the recognized text of the first portion and the recognized text of the second portion. Upon identifying a minimum number of matching pairs, a mapping between the first portion and the second portion can be determined using a mapping technique (e.g., affine transform, projective homography, etc.) based at least in part on a geometric correspondence between respective identified pairs of corresponding words. Based on this mapping, the recognized text of the second portion can be merged with the text canvas by adding words from the second portion to the text canvas using the matching word pairs as alignment data points.

Further, each word or text canvas element can contain a map of unique text strings that have appeared in a respective location over time (e.g., for each image), therefore, the words of the text canvas in overlapping regions of adjacent images (e.g., where the first portion overlaps the second portion) can be verified for accuracy. Accordingly, the techniques described herein provide more accurate text recognition than systems based on a single image. Further, the techniques described herein provide the ability to scan and recognize text of large documents, which do not fit in the view of a single image.

Various other functions and advantages are described and suggested below as may be provided in accordance with the various embodiments.

Figure 1B:
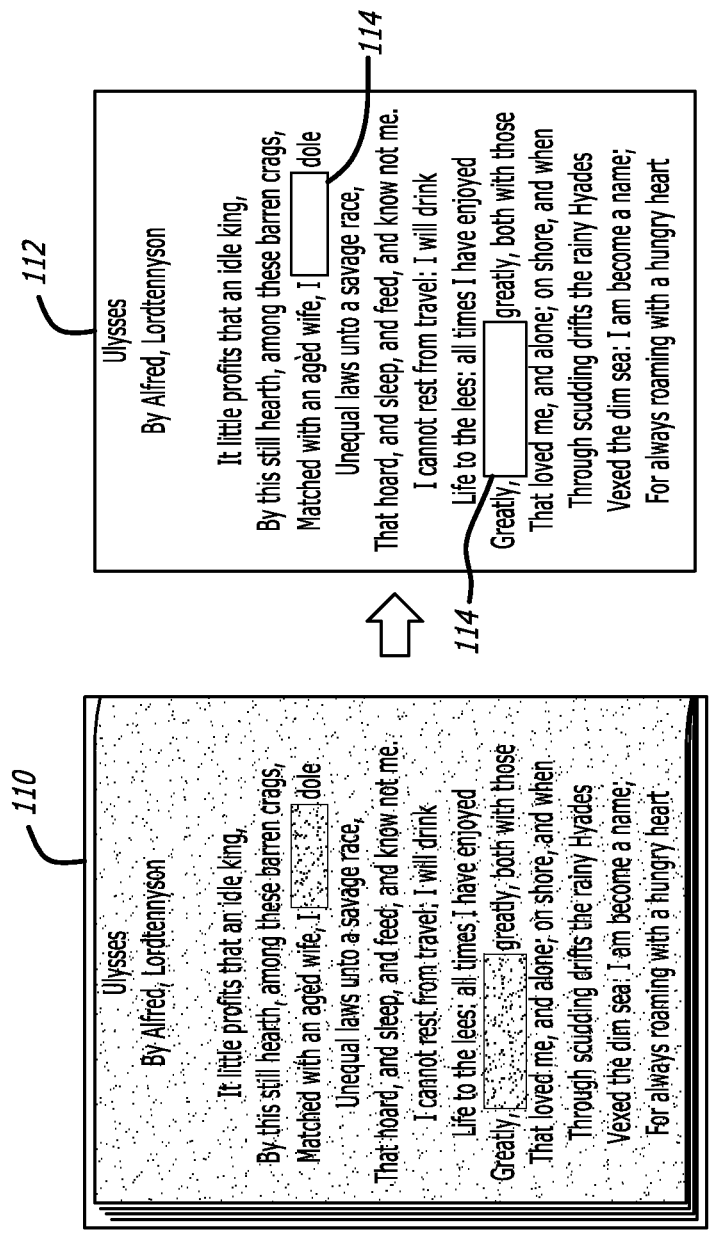
FIG. 1B illustrates an example visual representation of the single image captured in FIG. 1A in different text recognition stages, as used by conventional systems.

FIG. 1A illustrates an example situation 100 showing user 102 attempting to recognize text in book 104 using computing device 106. In order to recognize the text utilizing conventional systems, user 102 positions computing device 106 such that at least the relevant portion of text is within a field of view of a camera of computing device 106. The resulting image can then be displayed on a display screen 108 of computing device 106. FIG. 1B illustrates an example visual representation of single image 110 in different text recognition stages, as used by conventional systems. In order to accurately recognize text using a single image, the image typically needs to be of a relatively high quality, which depends on various factors, such as the power of the lens, light intensity variation, relative motion between the camera and text, focus, and so forth. Generally, an OCR engine can detect a majority of text characters in good quality images, such as images having uniform intensity, no relative motion effects, and including one or more objects upon which the camera was properly focused. Conventional OCR engines, however, are often unable to accurately detect all text characters in a single image, even a single good quality image. This imprecision is further exacerbated when attempting to recognize text from lesser quality images, such as images containing variations in lighting, shadows, contrast, glare, blur, and the like.

In FIG. 1B, image 110 contains a few artifacts (e.g., as a result of lighting variations, glare, blur, etc.), which are partially obstructing some of the text. In various examples, image 110 is converted into a binary mask 112 or a black and white representation where each pixel of image 110 is either completely saturated or unsaturated. In this example, since the artifacts are partially obscuring text in some areas, the text characters in these areas will likely be omitted when image 110 is converted into binary mask 112 resulting in holes or gaps 144 therein. Binary mask 112 is what is eventually communicated to an OCR engine for further processing and text recognition and the OCR engine will be unable to recognize text in the portions associated with gaps 206. Using only one image, therefore, can additionally result in missing information.

Further, with respect to FIGS. 1A and 1B, there is more text in image 110 than can fit in a single image (i.e., a portion of the body of text is outside a field of view of the camera) when taken at a distance where the text is sufficiently large enough to be recognized using an OCR engine. Accordingly, various approaches discussed herein enable a computing device to track and store results from an OCR engine over time as OCR results from subsequently images are collected. These OCR results are then aggregated together in order to piece together a larger volume of real-world text than can be captured in a single image and, additionally, to generate a more accurate digital representation of the text by verifying words within the text with multiple OCR results for a respective location therein. Techniques described herein, therefore, attempt to provide more accurate text recognition than techniques based on single image frames as well as provide the ability to scan and recognize text of large documents, which do not fit in the view of a single image. Such techniques can aid in increasing accuracy for various text recognition applications, such as business card recognition, mobile language translation, general text scanning, and the like. Further, such techniques could also be used to scan and digitize entire pages and books of text.

Figure 2:
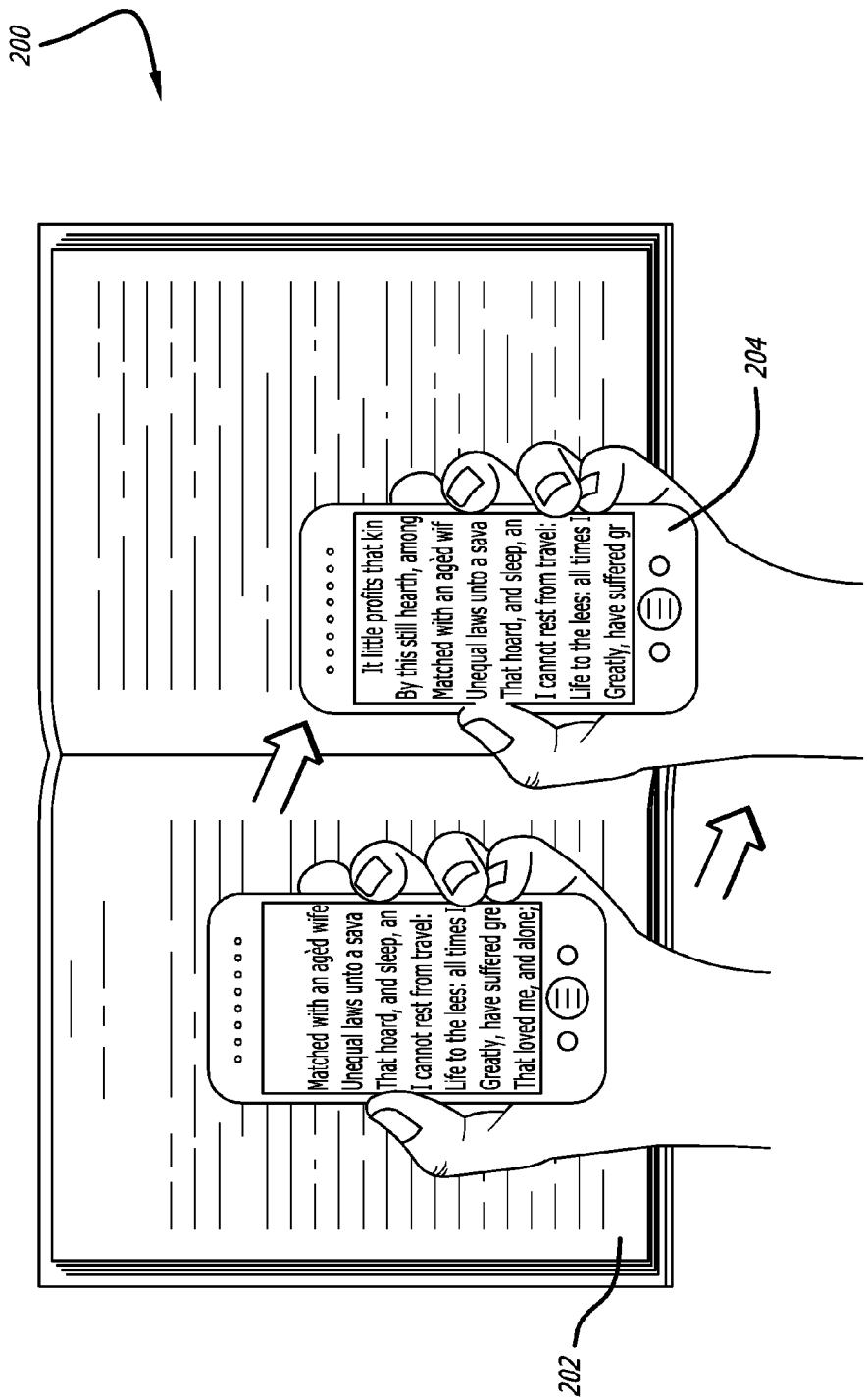
FIG. 2 illustrates an example of a user capturing image information of text from a book using a portable computing device in accordance with at least one embodiment.

FIG. 2 illustrates an example 200 showing user attempting to scan a large volume of text from book 202 using portable computing device 204 in accordance with at least one embodiment. Although a portable computing device (e.g., a smartphone, phablet or tablet computer, etc.) is shown, it should be understood that any device capable of receiving and processing input can be used in accordance with various embodiments discussed herein. These devices can include, for example, desktop computers, notebook computers, electronic book readers, personal data assistants, cellular phones, video gaming consoles or controllers, television set top boxes, wearable computers (e.g., smart watches or glasses), digital cameras, and portable media players, among others. In this example, as user moves computing device 204 across the page of book 202, images of the text are captured and user can see what is currently being captured by viewing a live field of view of the same on display. Accordingly, text aggregation uses OCR results from the image frames captured by computing device 306, in an attempt to stitch together scanned areas as new areas are scanned. In at least one embodiment, the text can be aggregated on computing device 204, where useful information, such as video input and system sensors (e.g., accelerometer, compass, gyroscope, Global Positioning System, magnetometer, etc.), can be utilized.

Figure 3:
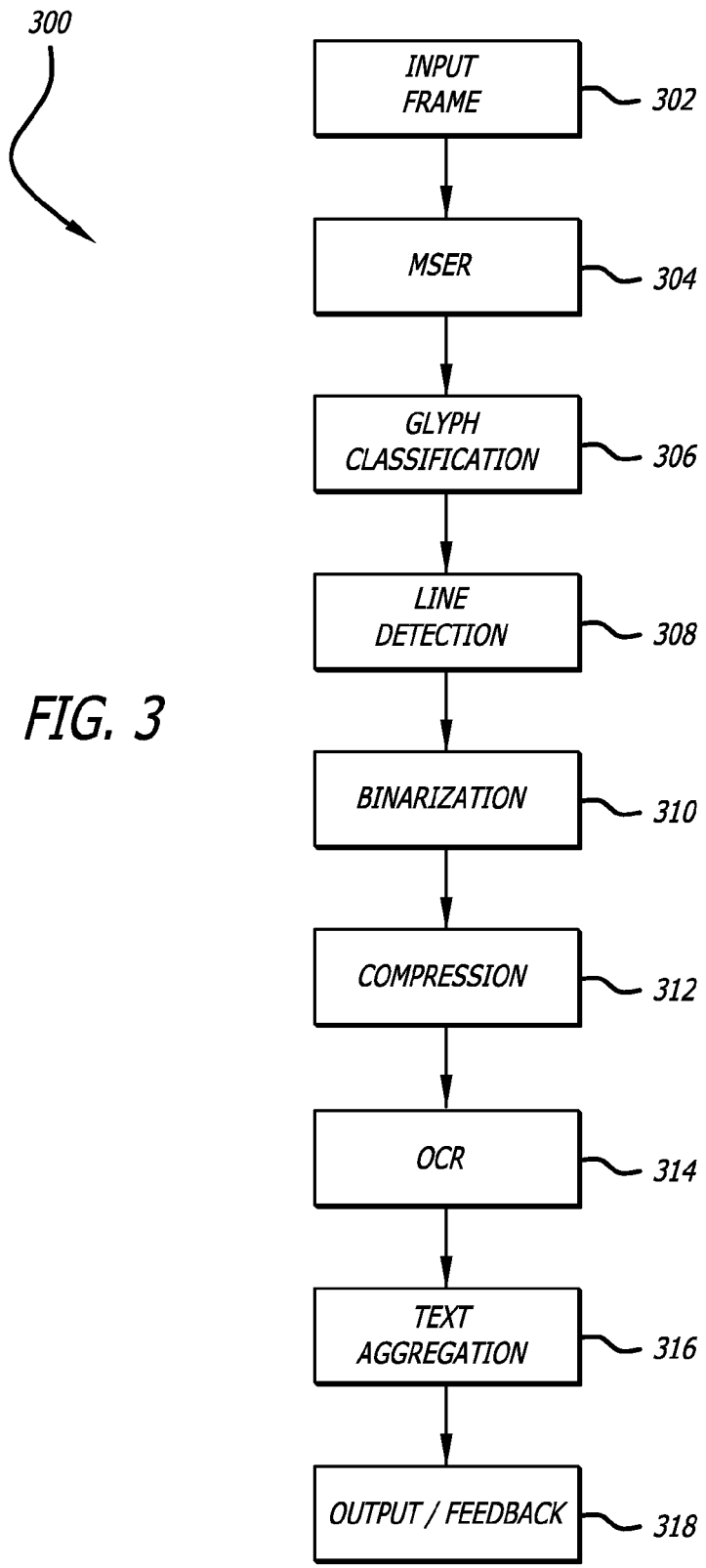
FIG. 3 illustrates an example process for aggregating text in accordance with at least one embodiment.

FIG. 3 illustrates an example flow 300 of a frame-to-frame tracking and OCR pipeline that can be used in accordance with at least one embodiment. It should be understood that, for this and other processes discussed herein, there can be additional, fewer, or alternative steps, performed in similar or alternative steps, or in parallel, within the scope of the various embodiments unless otherwise stated. In this example, a processing component of a computing device captures and processes an input frame or image, as captured in an active field of view of a camera, to detect text in the input frame 302. For example, the processing component can implement algorithms that detect and recognize the location of text in the input frame, and the region of the frame that includes the text can be cropped to create a region of cropped text.

In this example, detecting text in the image can include locating regions of extremes (e.g., regions of sharp transitions between pixel values) such as the edges of letters. The regions of extremes, or the maximally stable extremal regions (MSERs), can be extracted and analyzed to detect characters, where the detected characters can be connected and aggregated 304. An extremal region can be a set of connected pixels which have grayscale values above some threshold, and where the size of the region does not change significantly when the threshold is varied over some range. In addition to being stable, the regions can contain most of the edge intensity found by computing a gradient image beforehand. Regions that either have too many or too few pixels, and any MSER whose aspect ratio is too different from normal text or which has more than three child regions, can be ignored.

Text detection in an image can include performing glyph detection on the captured image. The image can be separated into regions of similar grayscale values that fall within predefined size constraints called glyphs. Glyph classification can then be performed, where any glyphs that are not characters are removed using machine learning algorithms or other similar algorithms 306. Pair finding/word finding can then be performed, where the glyphs are grouped into words and lines, and baseline estimation can then be performed on the words and lines to estimate lines for the top and bottom points on the words. Word splitting can then be performed, where the spaces between the glyphs can be examined to decide word boundaries used for evaluation or display purposes.

In accordance with an embodiment, glyph classification can further include extracting features from each MSER, the features including: Bounding Box Aspect Ratio (width over height); Compactness (4 pi times area over perimeter squared); Raw Compactness (4 pi times number of pixels over perimeter squared); Stroke Width (estimated using distance transform) divided by width; Stroke Width (estimated using distance transform) divided by height; Solidity (area over bounding box area); Convexity (convex hull perimeter over perimeter); Number of Holes (e.g., a 'b' has 1 hole, a 'B' has 2 holes, a 'T' has 0 holes). A fixed set of features can be selected and used to train a classifier using a machine learning algorithm such as a support vector machines (SVM) or AdaBoost. A classifier can be used to reject most non-characters from the list of characters, and an operating point on the receiver operating characteristic (ROC) curve can be chosen so that most characters are detected (ie. a low false negative rate), but with a high false positive rate. Further, pair finding can also include sorting the remaining glyphs (MSERs which appear to be characters) left to right, and all pairs which pass a test can be considered a possible character pair. The test compares the distance between glyphs, vertical overlap of two glyphs, their relative height, width, stroke width, and intensity.

In this example, a text line algorithm can be used to determine an orientation of connected characters 308. Once an orientation of the characters is determined, a binary mask of the region containing the characters can be extracted 310. The binary mask can be converted into a black white representation, where the regions are binarized to produce a crisp mask which can include any punctuation that may have been filtered out earlier due to the minimum size constraint. Thereafter, the region of binarized text or binary mask can be, in this example, compressed into a PNG file 312. Accordingly, after compression, the PNG file can be communicated to a remote server to be processed by an OCR engine or, alternatively, the OCR engine could reside locally on the portable computing device 314.

Detecting text in an image can include more or fewer steps as described above and this method can be performed on each image frame (or every $n^{th}$ frame) upon being captured in a frame-to-frame tracking mode. As a result, many images are captured, resulting in many OCR outputs. In this example, text aggregation uses these OCR results in an attempt to stitch together newly scanned areas of a document, while improving the recognized results of overlapping regions 316. Accordingly, text output or feedback can be provided to the user 318. In this example, the aggregated text can be displayed to the user or feedback can be provided to guide or instruct the user to perform actions to increase the quality of the aggregated text output. For example, the feedback can be provided in a form that instructs a user to make additional passes over certain text regions in order to improve recognition results or system confidence associated with text in those regions. Alternatively, the feedback can be provided the form of real-time recognition results, thereby, enabling the user to visually identify errors or discrepancies (i.e., between the scanned text and corresponding output) and rescan (i.e., move the computing device such that the field of view of the camera captures additional image information) of the region(s) containing these errors or discrepancies. Additionally, the output could be provided in a text tool, enabling the user to edit, copy, paste, search the aggregated text, for example, among other such features.

Figure 4A:
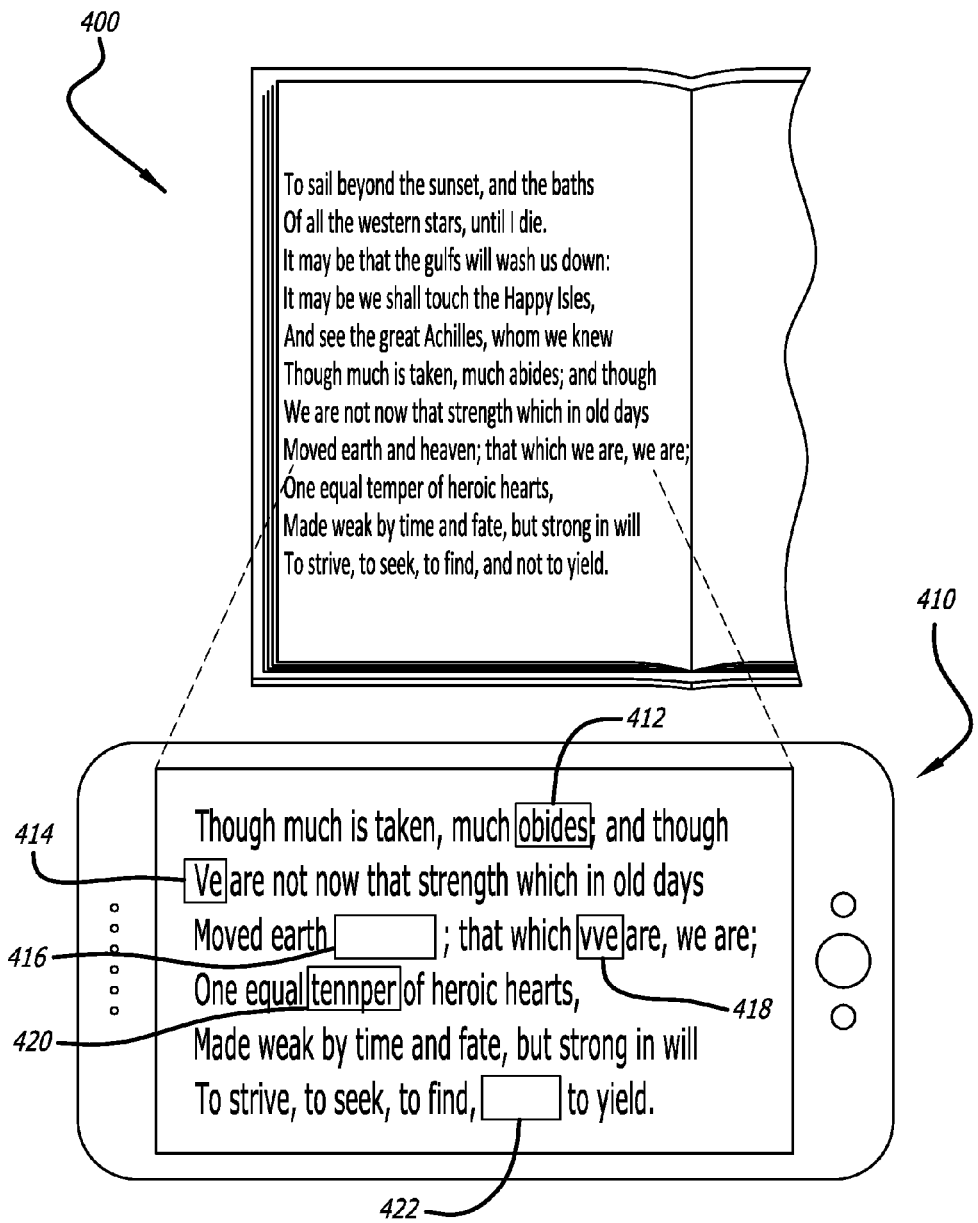
FIGS. 4A, 4B, and 4C illustrate an example visual feedback process as multiple images of text are aggregated in accordance with at least one embodiment.
Figure 4B:
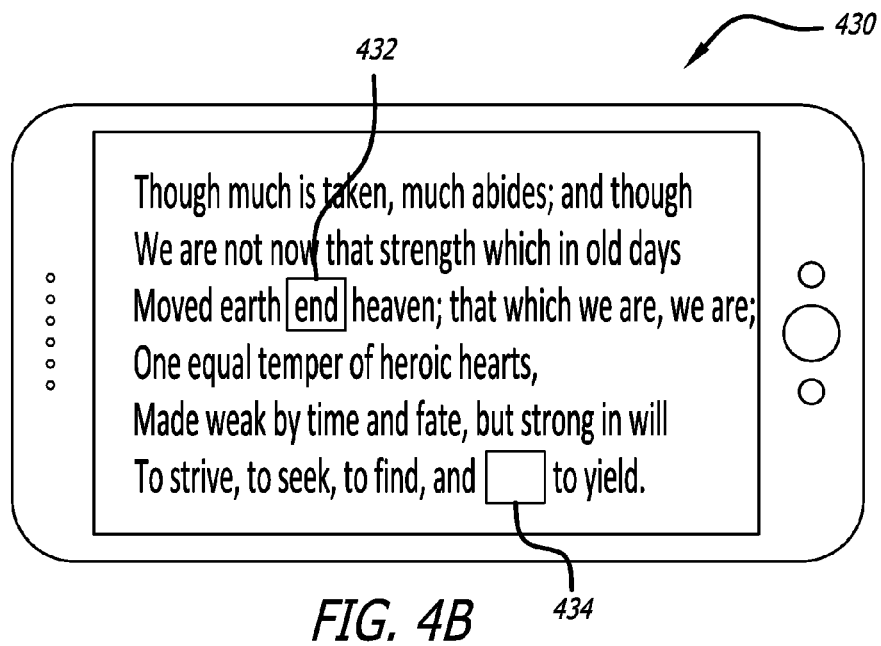
Figure 4C:
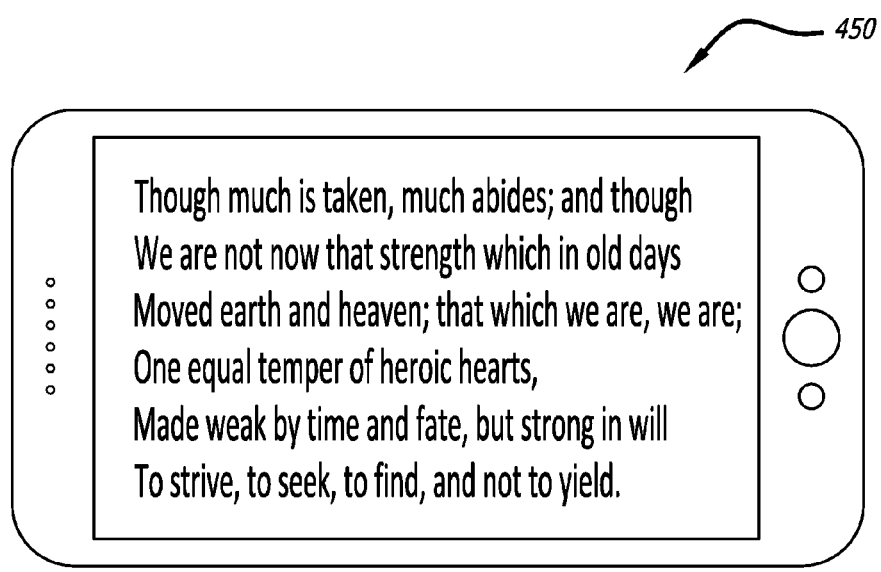

FIGS. 4A, 4B, and 4C illustrate an example visual feedback process as multiple images of text from book 400 are aggregated in accordance with at least one embodiment. In this example, a computing device has at least one image capture element, such as a camera or camera sensor, operable to perform functions such as image and/or video capture. Each image capture element may be, for example, a charge-coupled device (CCD), a motion detection sensor, or an infrared sensor, or can utilize another appropriate image capturing technology. In this example, a user is interested in capturing text from book 400 where at least a portion of the text is outside a field of view of the image capture element. In order to obtain this information, the user can position the computing device such that the portions of book 400 the user wishes to capture pass within a field of view of the at least one image capture element. The resulting image or frame of a "live" view as captured by a video mode can then be displayed on a display screen of the computing device.

FIG. 4A shows a first screen shot 410 corresponding to a first frame captured of the text from book 400. In this example, since only one image has been captured, the output contains incorrectly recognized characters and holes in the text corresponding to a word that was not recognized. In this example, screen shot 410 contains misrecognized words "obides" 412, "ve" 414, "vve" 418, and "tennper" 420. Further, there are also holes (416, 422) in the text that the algorithm knows contain text, but was unable to recognize the text respectively therein above a threshold confidence level. Accordingly, in this example, the algorithm knows, for a respective hole (416, 422) in the text, that there is a word or at least text characters in the same based on the location of respective bounding boxes associated with adjacent words or text strings. In this example, if a text recognition method only used a single image to recognize the text of book 400, the output would not only contain errors resulting from misrecognized words, but would also contain missing information. Accordingly, a method in accordance with various embodiments described herein can use multiple images (or image information captured over a period of time) to generate a more accurate and, selectively, larger representation of text than can be generated using a single image. For example, information about each of the same respective text strings from the multiple images can be used, compiled, or aggregated to increase confidence for a respective text string or individual text characters within a respective set of bounding box coordinates in order to construct a more accurate representation of a body of text being scanned. Such a method provides multiple opportunities to correct potential errors or discrepancies and fill holes by aggregating a number of text string or character occurrences with their corresponding confidence levels.

Accordingly, FIG. 4B shows a second screen shot 430 corresponding to a second (which is not necessarily the very next) frame captured of the text from book 400. In this example, the misrecognized word "obides" 412 from FIG. 4A has been corrected to "abides", "ve" 414 has been corrected to "we", "vve" 418 has also been corrected to "we", and "tennper" 420 has been corrected to "temper" by aggregating the text strings or individual text characters and their corresponding confidence levels for the two images. Further, holes (416, 422) have been partially filled, however, each of holes (416, 422) requires additional refinement. For example, hole 416 now contains the misrecognized word "end" 432, which is not correct and will be described in FIG. 4C, and hole 422 has been partially filled with the word "and", but now contains a relatively smaller hole 434. FIG. 4C shows a third screen shot 450 corresponding to a third frame captured of the text from book 400. In this example, misrecognized word "end" 432, has been corrected to the word "and" and hole 434, which was a smaller hole of hole 422, has been filled with the word "not". Accordingly, third screen shot 450 contains the most accurate representation of text from book 400 as a result of being a compilation or aggregation of the text and corresponding confidences of all three frames.

Figure 5A:
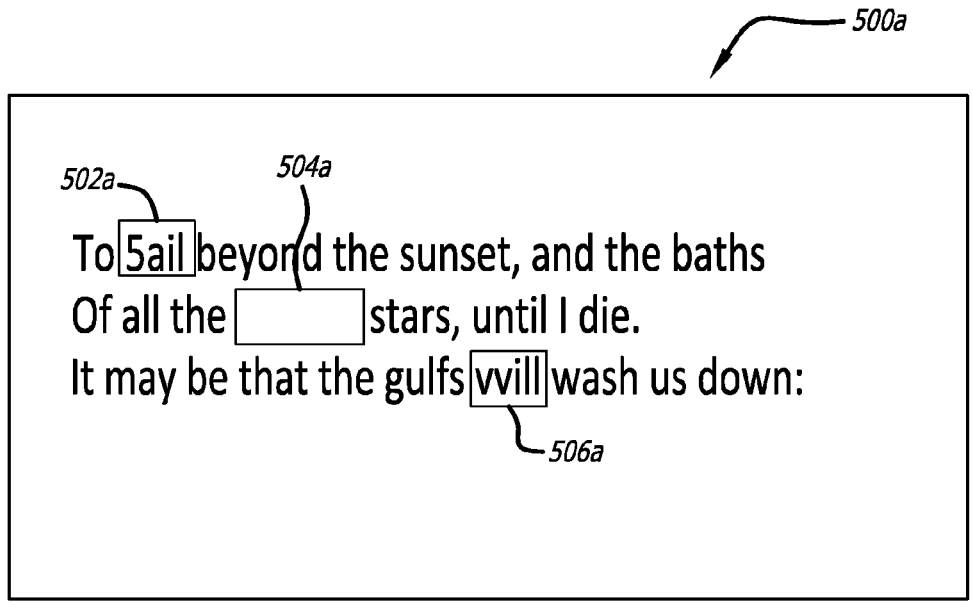
Figure 5B:
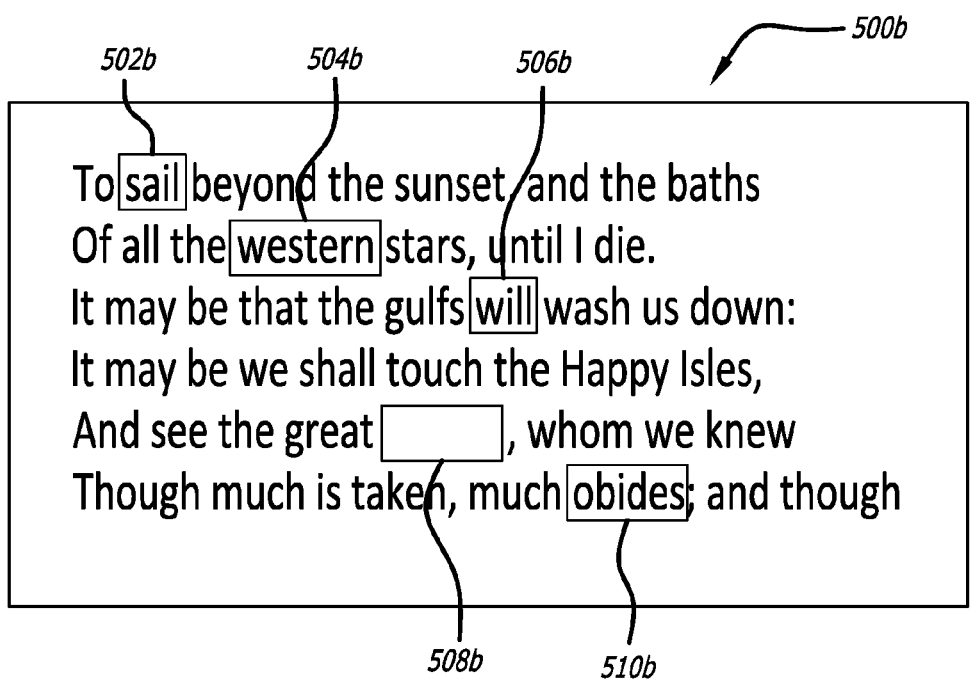

FIGS. 5A, 5B, and 5C illustrate an example visual process showing a text canvas generation process as multiple images of text are aggregated in accordance with at least one embodiment. FIG. 5A shows an initial first iteration 500a of a text canvas resulting, for example, from a first (single) image of a body of text in a sequence. In this example, the first image could have been captured as a user started scanning from the top of a page of a book, for example, on which the body of text is printed on. Since the first image was captured at the top, the three lines of text could have been captured at the bottom of the first image with the top of the first image capturing a plain white header or border of the book that does not contain any text. Accordingly, the text canvas initially contains only the three lines of text captured in the first image. As similarly described above, these three lines of text (being captured in a single image) include text strings that have been misrecognized resulting in misspelled words (502a, 506a) and hole 504a where a word that the OCR algorithm was unable to recognize above a threshold confidence is missing from the text. In this example, misspelled word 502a is "5ail" and misspelled word 506a is "vvil".

FIG. 5B shows a second iteration 500b of the text canvas resulting from merging first iteration 500a with a second image of potentially a slightly different portion of the same body of text that also includes a portion captured in the initial image. In this iteration, three additional lines of text from the body of text have been added to the text canvas, misspelled words (502a, 506a) have been corrected, and hole 504a has filled. In this example, as the user continues to scan downward, more of the text comes into the field of view of the camera. For example, the first three lines could be closer to the top of the second image relative to their location in the first image, thereby revealing the additional three lines of text now shown in second iteration 500b near the bottom of the second image.

In at least one embodiment, merging the second image with the text canvas can include identifying pairs of corresponding words between the text canvas and the second image. New text strings from the second image (i.e., strings not present in the first image) can be added to the text canvas using the identified pairs (e.g., bounding boxes of the identified pairs) as alignment points. In this example, the text canvas and the second image have three lines of text in common and, therefore, many identifiable corresponding pairs. However, not all of these pairs may be initially considered a corresponding pair. For example, "sail" 502b, if initially correctly recognized in the second image, will not match misspelled word 502a which is "5ail". Accordingly, locations (e.g., as identified by their respective bounding boxes) known to contain text (i.e., a text string or individual text character) in both the text canvas and the second image that do not match, can be combined along with their respective confidence scores in order to increase the chances of determining the correct string or character, respectively. This process will be discussed later in more detail below.

Accordingly, as a result of the second image being merged with the text canvas in second iteration 500b, misspelled word 502a or "5ail" has been corrected to "sail" 502b, misspelled word 506a or "vvil" has been correct to "will", and hole 504a has been filled with word 504b or "western", as shown in FIG. 5B. Additionally, the OCR engine was unable to recognize all of the new text from the additional three lines of text that were added from the second image. For example, the OCR engine was unable to recognize text in hole 508b and has misrecognized the text of word 510b, which it has recognized as "obides".

FIG. 5C shows a third iteration 500c of the text canvas resulting from merging second iteration 500b with a third image of potentially a slightly different portion of the same body of text that was captured in both the first and second images, but that also includes a portion captured in both of those images. In this example, the user has continued to scan downward, thereby capturing five more additional lines of text of the body of text. Since the user has moved/scanned downward, at least a portion of the first few lines that were capture in the first and/or second image may now lie outside the field of view of the camera and are, therefore, not present in the third image. Accordingly, no additional information can be added, merged, or verified for this portion unless the user later goes back and scans this portion again. As discussed above, the newly captured lines have been added to the text canvas and additional information for text in hole 508b and misrecognized text of word 510b has been merged enabling the correct words for these locations to be determined and presented to the user. Hole 508b has been filed with "Achilles" 508c and "obides", word 510b, has been changed/corrected to "abides" 510c. Accordingly, as the user moves their computing device and captures images of different portions of the body of text, new text (i.e., text appearing for the first time) will be added from each image to the text canvas and existing text (i.e., text appearing one or more times before) will be used to verify or correct previous results (i.e., increase confidence in existing text).

Figure 6:
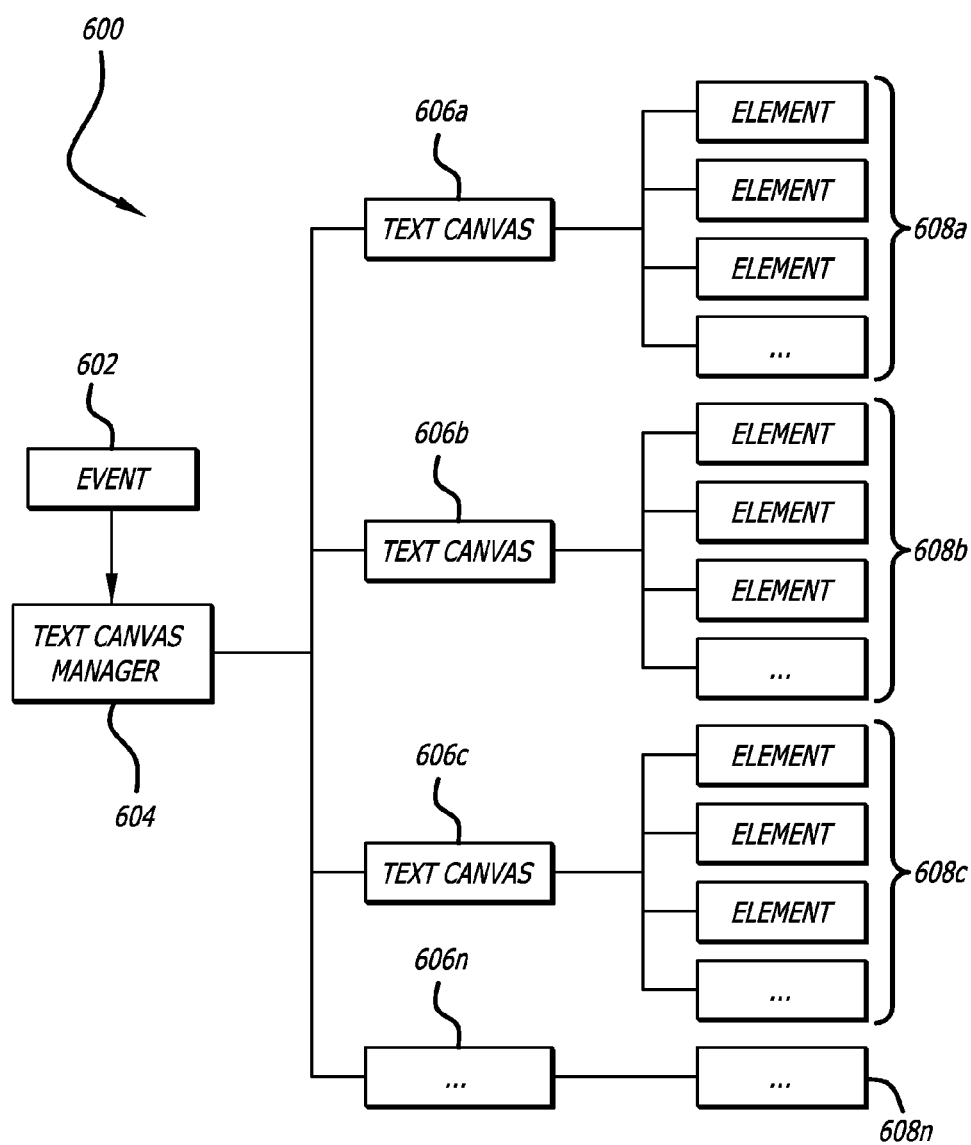
FIG. 6 illustrates an example diagram outlining text aggregation components and interactions that can be used within the scope of various embodiments.

FIG. 6 illustrates an example diagram 600 outlining text aggregation components and interactions that can be used within the scope of various embodiments. In this example, there is a text canvas manager 604, text canvases (606a, 606b, 606c, . . . 606n) (i.e., a digital representation of text), and individual text canvas elements (608a, 608b, 608c, . . . 608n) which together make up the text canvases. Each text canvas contains multiple text canvas elements. As used herein, each text canvas element represents one word with estimated bounding box coordinates within the device reference frame. Each text canvas element also contains information about strings previously decoded or recognized within the same bounding box coordinates. For example, the word "pipeline" could be associated with a particular location within a text canvas, but is misrecognized in one or more image frames. In a first frame, "pipeline" could be recognized as "pipe l ine," as "pipelin" in a second frame, "plpeline" in a third frame, and "pipeline" in fifth and sixth frames. Accordingly, information for each of these strings can be stored and associated with a bounding box for the location of this word within the text canvas.

Text canvas manager 604 handles the incoming events 602, manages, and tracks text canvases (606a, 606b, 606c, . . . 606n). At any given time, there can only be one current text canvas and previous text canvases (e.g., previous OCR scans) can be stored for future redetection and possible aggregation into a stored text canvas. For example, if a user scans a page of a book followed by a business card, the user can go back to the book page and pick up where they left off (e.g., retrieving a stored text canvas).

Figure 7:
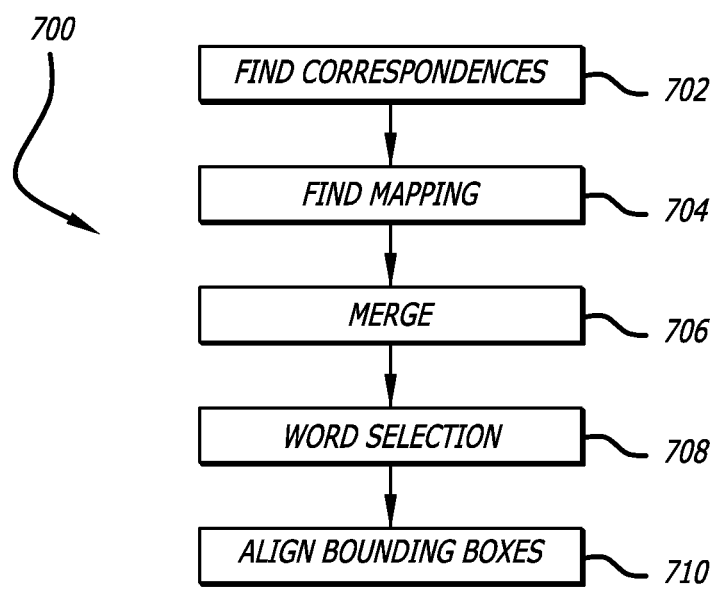
FIG. 7 illustrates an example process for aggregating text in accordance with at least one embodiment.

FIG. 7 illustrates an example stitching or merging process 700 that can be used in accordance with at least one embodiment. In this example, correspondences between words of a current text canvas and a new OCR result are identified 702.

If there is an existing text canvas corresponding to a new OCR result, then the new result must be "merged" or "stitched" together with the existing text canvas. In at least one embodiment, this process is similar to image match verification, where corresponding pairs of words between image frames are located using an algorithm (i.e., RANSAC, etc.) to identify a geometric correspondence between two images. Accordingly, these corresponding pairs of words are first identified by first sorting both word lists by string length (and removing short strings). Then both lists are analyzed to collect exact string matches between the two sorted lists and this process continues until a threshold number of corresponding pairs between the two lists have been identified or until an end of one of the lists is reached.

Once a threshold number of corresponding pairs between the two lists has been identified, a weighted algorithm (e.g., RANSAC, etc.) analyzes both the text canvas and the new OCR result to find a mapping between the same 704. In at least one embodiment, the text canvas and the new OCR result are analyzed in an attempt to identify an affine mapping, however, any mapping, such as projective homography and the like, could also be used. In at least one embodiment, a number of randomly selected points sufficient to solve the mapping are chosen for each iteration of the weighted algorithm.

Accordingly, a score for the current mapping can be calculated by summing up all the weights of the corresponding word pairs by string lengths that overlap with the current mapping. At the end of a fixed number of iterations, the mapping that results in the highest score is chosen. The resulting mapping often has a significant impact on updated text canvas element locations for the current text canvas. This step, therefore, can correct for tracker drift or errors if any are present. This mapping can also send a signal to the tracker that the track has been corrected, which could in turn help other tracking functionality and better updated other tracked objects.

For example, three random words can be used to calculate an affine mapping. After applying the mapping to place the text canvas on top of the new OCR result, the following words from each word list line up:

Back-Back (length—4 characters)
The-The (length—3 characters)
Prudence-Prudence (length—8 characters)

In one example, the weighted score could sum the string length of each matching pair (i.e., 4+3+8=15). In some cases, however, a suitable mapping (i.e., above a threshold number of corresponding word pairs) may not be available as a result of little to no overlapping words, such as if the computing device has moved significantly from the last OCR result. In this case, no mapping is applied and the new OCR result is merged with the current text canvas without determining a mapping between the same. In some instance, this can be perfectly fine, since the tracking algorithm may not experience or generate any errors consequence and any errors that do result from the same can be corrected by subsequent OCR results.

When an appropriate mapping is determined between the current text canvas and the new OCR result, the two entities (e.g., corresponding word/text string pairs for a respective location) are then merged 706. In this step, each word from the new OCR result is added to the current text canvas if a respective word does not overlap with any other current text canvas elements (e.g., words). If a new word does overlap with current text canvas element (e.g., according to a determined overlap threshold), then the word is merged into the respective text canvas element. For a respective text canvas element location (e.g., bounding box), information for character strings that have occurred in that respective location are stored along with their corresponding OCR confidence scores. Accordingly, at the end of a respective scanning period, each text canvas element may contain a sum of scores for each character string that has appeared in a respective location. For example, a respective text canvas element location could have seen the following character strings from six OCR results (words and corresponding scores from six images):

'Chowder': 100
'Chow': 40
'Chowder': 60
'Cowder': 30
'Chowder': 120
'Chowder': 110

The scores for each unique character string can be summed, resulting in the following map:

'Chowder' >390
'Chow' >40
'Cowder' >30

Accordingly, 'Chowder' has the highest score among these six results.

Other factors for determining an appropriate word/text string for a respective text canvas element can also be used independently or in conjunction with the word scoring method described above. For example, a respective text canvas element can be determined simply based on confidence score returned by OCR, a number of times a respective word appears in a respective location, the length of a respective text string, and the like. Further, other factors may also be used to boost or incrementally increase a confidence for a respective word. For example, a respective confidence score may be increased if a respective word is recognized as a known or classified text entity (e.g., having a defined character structure, such as a phone number, email address, URL, etc.). The confidence score for a word could also be affected by the word's respective location in a particular image. For example, words near the center of a particular image could have their confidence scores boosted relative to words near the image's edges. The confidence scores of words at the center could be increased while the confidence scores of words near the edges are kept constant. The confidence scores of words near the edges of a particular image could also be decreased while the confidence scores of words near the center of the image are kept constant. Further, the confidence scores for words in an image could be increased, decreased, or both as a function of location with the center being associated with relatively higher confidence scores and the edges being associated with relatively lower confidence scores. Additionally, each recognized word could be compared to a dictionary and the confidence scores of words recognized in the text that are found in the dictionary can be boosted.

In this example, after the current text canvas and the new OCR result have merged, words being added to the text canvas are selected 708. Each text canvas element contains a map of all of the unique strings it has seen over time (i.e., for each image or merged image information instance) and their summed scores. In one example, the string with the highest score can be chosen to represent the word in a respective location in the text canvas. Alternatively, each of the character stings can be optimized at the character level. First, multiple strings are incrementally aligned to build a transition network using dynamic programming. Then, the candidate with the highest count is selected for each character in the network.

The following is an example of alignment and "*" means a NULL character:

Candidate 1: *****//www.abc12B.com
Candidate 2: http*********************
Candidate 3: http*//www.abc123.com
Candidate 4: http://www.abo123.com In this example, the final result is http://www.abc123.com, which fixes errors in each of the four candidates.

After the new OCR result is merged into the current text canvas, the bounding boxes for each text canvas element are aligned to have the same orientation 710. In at least one embodiment, this step can be optional, since all of the text is assumed to already be oriented in the same direction. In this example, the bounding box orientation of the new OCR result can be used and all other bounding boxes are analyzed to ensure that they are oriented in the same direction.

Accordingly, when there is not a current text canvas or a new document is being scanned for the first time, a new text canvas will be generated initially from the first OCR result of the new document (i.e., first frame captured of the new document). Instead of always starting with a new text canvas, the newly generated text canvas can be compared to stored text canvases to determine whether the newly generated text canvas is part of a text canvas stored in memory, such as if the user had started a scan, did not finish, and later came back to complete the same. In order to determine whether the newly generated text canvas is part of a text canvas stored in memory, the stitching algorithm mentioned above is run on each previous text canvases. If one of the resulting mapping scores is above a threshold, then the new text canvas is identified as part of a previous text canvas stored in memory and the two text canvases are merged together. This can be especially helpful when a track is lost while a user is scanning a body of text, such as if they were interrupted. In such a case, redetect can identify that a new text canvas as a pervious text canvas and pick up where the user left off, instead of starting over from the beginning.

In at least one embodiment, words near an edge of an image or OCR result frame can be disregarded or omitted from consideration. For example, if a frame is centered in on a paragraph of text that includes a sentence, such as "Colorful clay is often one floor above you," the edges of the sentence could be clipped to "orful clay is often one flo," as a result of each end of the sentence lying outside of the image frame. In order to prevent clipped character stings from being consider and, thereby, effecting the resulting text canvas, each word in an OCR result can be analyzed to identify words with bounding boxes within a determined distance of an edge of a respective image frame. Accordingly, having identified a set of words near the frame edge, he confidence scores for these words can be penalized to decrease the chances of incomplete or clipped words being chosen over the respective full and correct words.

In at least one embodiment, the text aggregator described herein can make use of a frame-to-frame tracking algorithm, which keeps track of mappings between frames over time. This mapping enables the locations of text canvas elements to be updated for a current frame as each new OCR result is obtained. The tracking algorithm can also indicate that a current tracking of element has been lost and a detection continuity of elements between frames has been interrupted, which may result when there is too much motion between image frames, such as if the user has moved the computing device to a new location. Upon losing track, the current text canvas can be automatically saved, however, no current text canvas exists any longer until a new OCR result is obtained to generated a new text canvas.

Figure 8A:
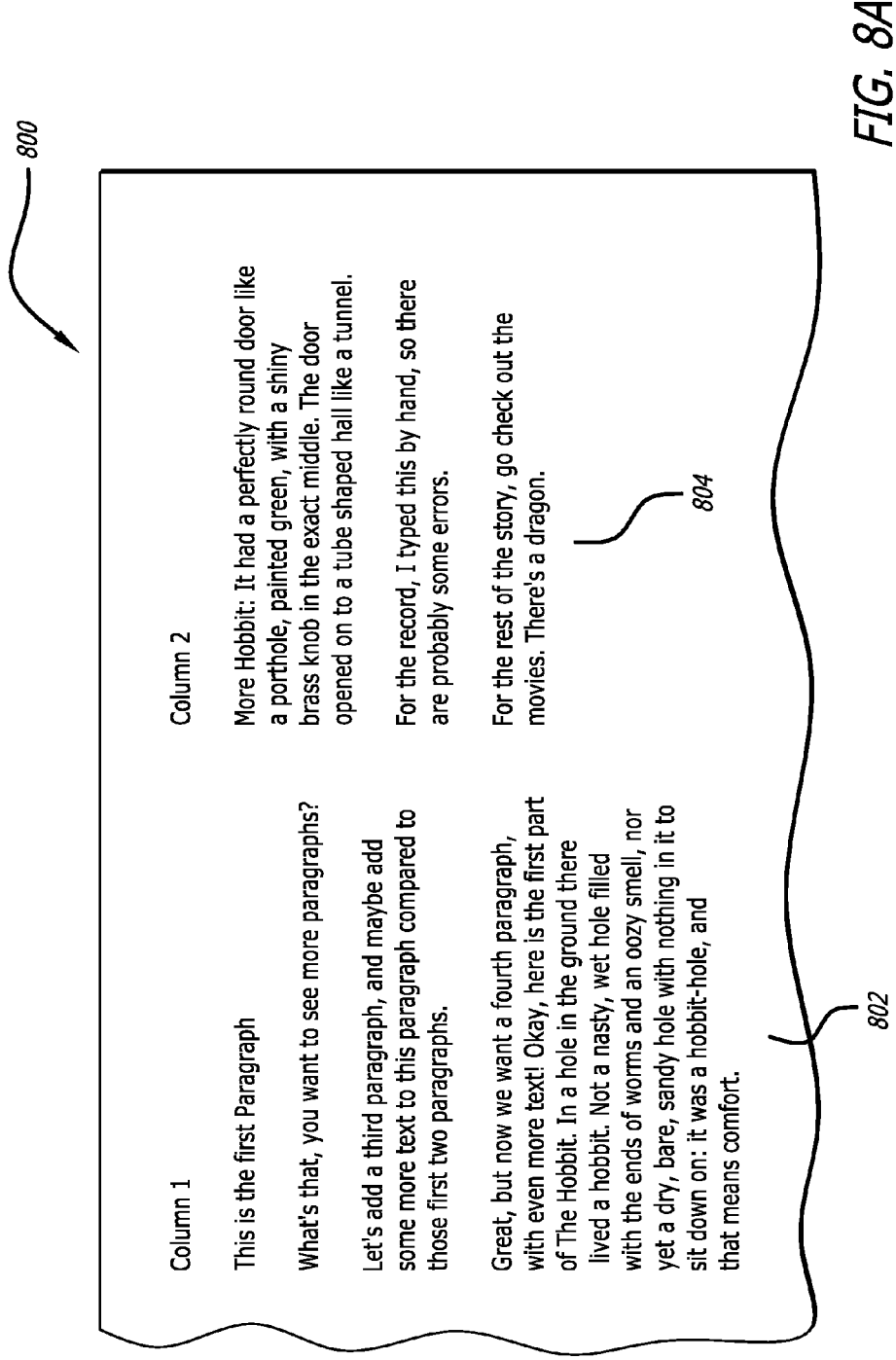
Figure 8B:
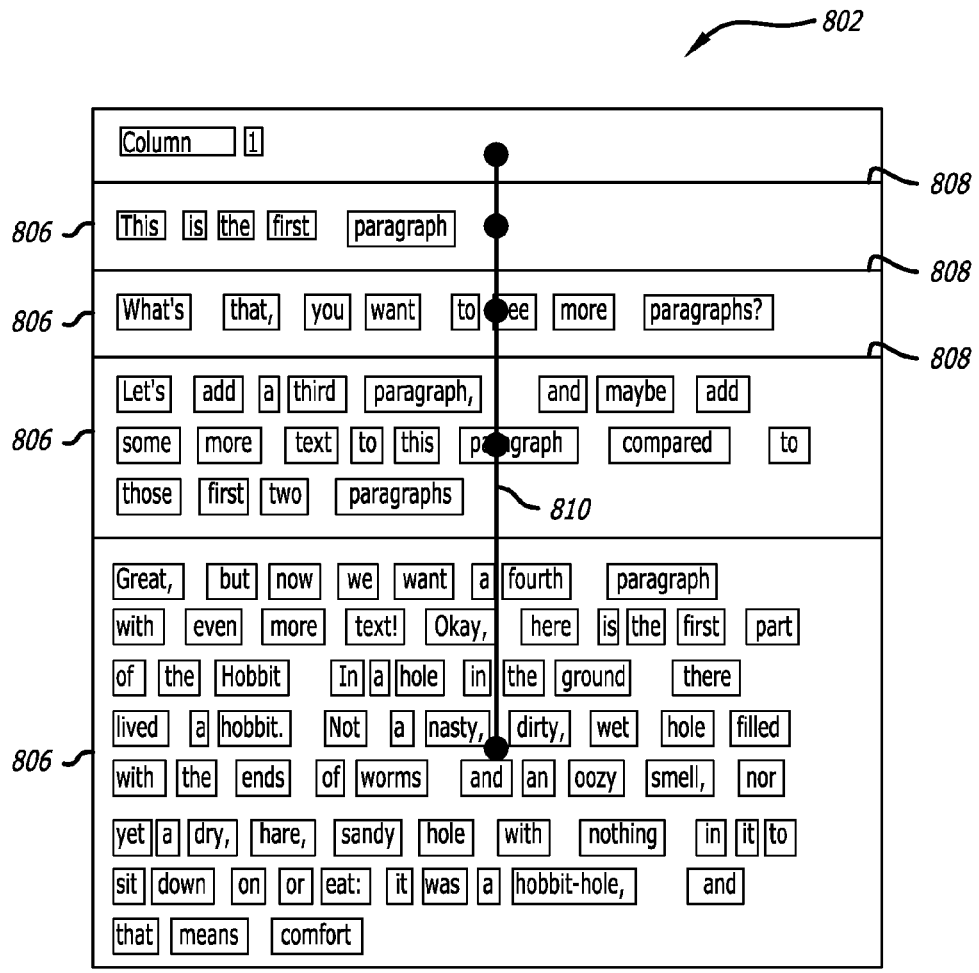

FIGS. 8A, 8B, and 8C illustrate an example visual process for detecting page segmentations, such as columns of text, in order to reproduce a natural reading order of scanned text in accordance with at least one embodiment. FIG. 8A illustrates a body of text 800 that is composed of a first column 802 and a second column 804. Such a layout of text can be challenging when reproducing and merging text since a sentence from second column 804 could be confused as a continuation of a sentence from first column 802 that either ends or continues on a next line of first column 802. Accordingly, a page segmentation algorithm can be used to detect boundaries of text, such as first column 802 and a second column 804, in order to reproduce the natural reading order of a body of text organized into such segments.

FIG. 8B illustrates first column 802 that has been decomposed into one or more rectangular blocks 806 by one or more boundary lines 808. Further, each word or text sting is shown bounded by a bounding box. In one example, vertical and horizontal bitmap projections of the text (i.e. summing pixels in a line or, alternatively, bounding boxes) can be projected to the sides of a respective page and a white space density graph can be generated. This density graph will then contain peaks for vertical or horizontal whitespace lines that define the boundaries between paragraphs and columns. For example, there will be a peak in the vertical direction for each boundary line 808. Accordingly, these peaks and are used to segment the document into smaller portions. Further, the center point of each rectangular block 806 can be determined and the rectangular blocks 806 can be aligned using first alignment line 810, which is a vertical line through the respective center points of each rectangular block.

FIG. 8C illustrates body of text 800 with first column 802 and a second column 804 each respective decomposed into their corresponding rectangular blocks and separated by vertical or column boundary 812. In this example, second column 804 includes second alignment line 814 connecting the center points of the rectangular blocks of second column 804. First alignment line 812 and second alignment line 814 collectively define the natural reading order of the scanned text and can be displayed to a user.

As a document is scanned, a current text canvas is generated. In the simplest form, the text canvas consists of words inside of bounding boxes floating in a two-dimensional (2D) space with respect to a camera input screen. There are many ways to convey this information to an end user. In one example, the output displayed on the display screen does not include any relational information between each of the words or text canvas elements. Also, some of the words off of the screen (not shown) can be aggregated from previous OCR results, as discussed herein. In another example, the bounding boxes and words therein could be displayed to a user as each word is scanned and recognized in real-time. This would enable the user to be provided with almost instant feedback regarding accuracy and the like. Further, the floating text could be displayed in a variety of colors, fonts, or animations to, in at least one implementation, differentiate the floating text from the image or to represent the confidence level the algorithm has in the recognized text being displayed to the user.

Figure 9:
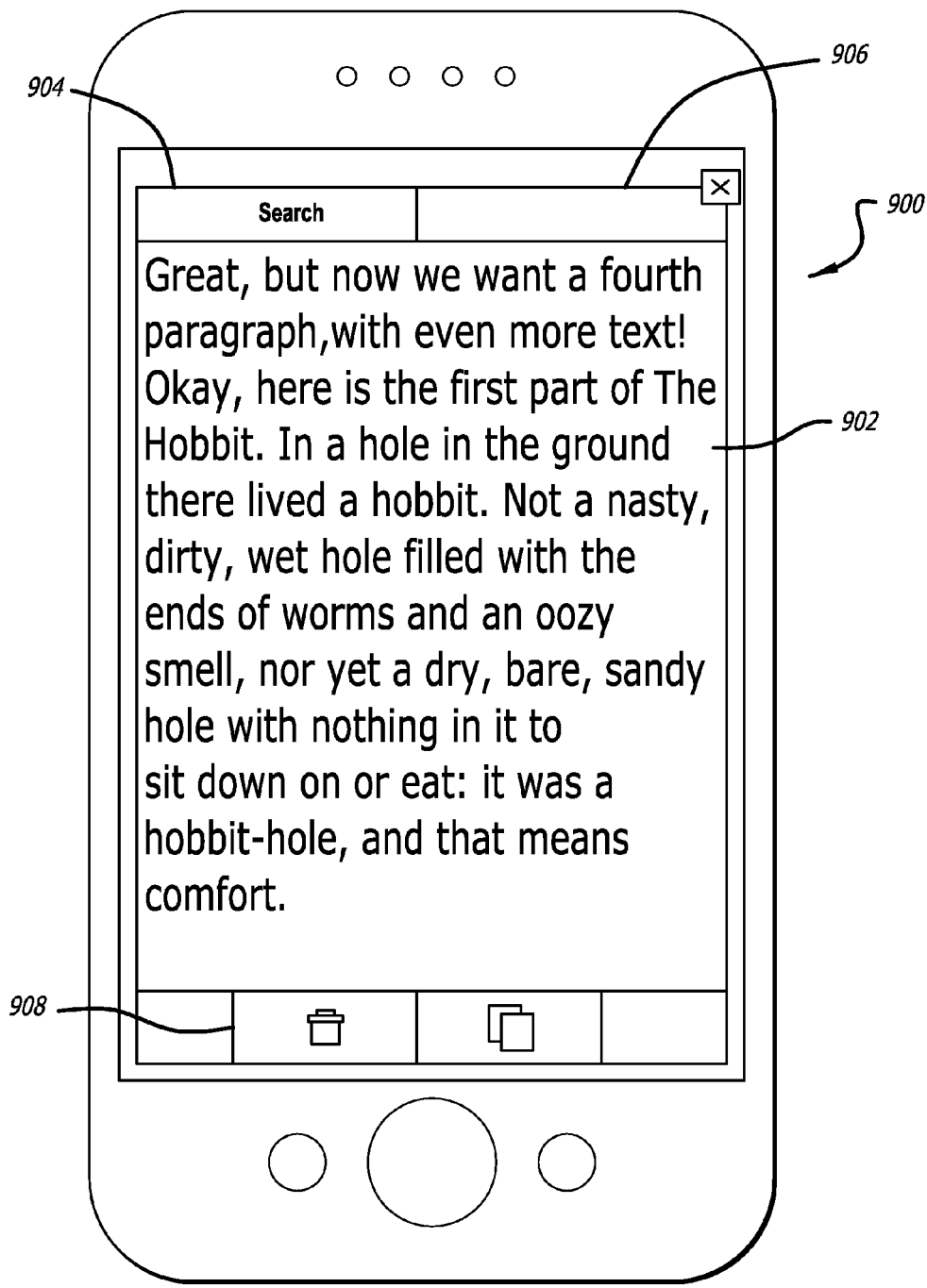
FIG. 9 illustrates another example portion of an aggregated text output displayed on a computing device accordance with various embodiments.

In at least one embodiment, the layout of the scanned text can be recreated or reproduced and presented to the user for further use or interaction. FIG. 9 illustrates such an example where portion of aggregated text output 902 displayed on computing device 900 in accordance with at least one embodiment. For example, the user could select a portion of the text to use as a search query 904, delete 908 portions of the text or the entire text canvas, or the user could perform other actions 906, such as copy/paste the text, edit the text, email the text, share the text with other users, and the like, Various other display and output methods, presentations, and applications can be utilized and provided as well within the scope of the various embodiments.

Figure 10B:
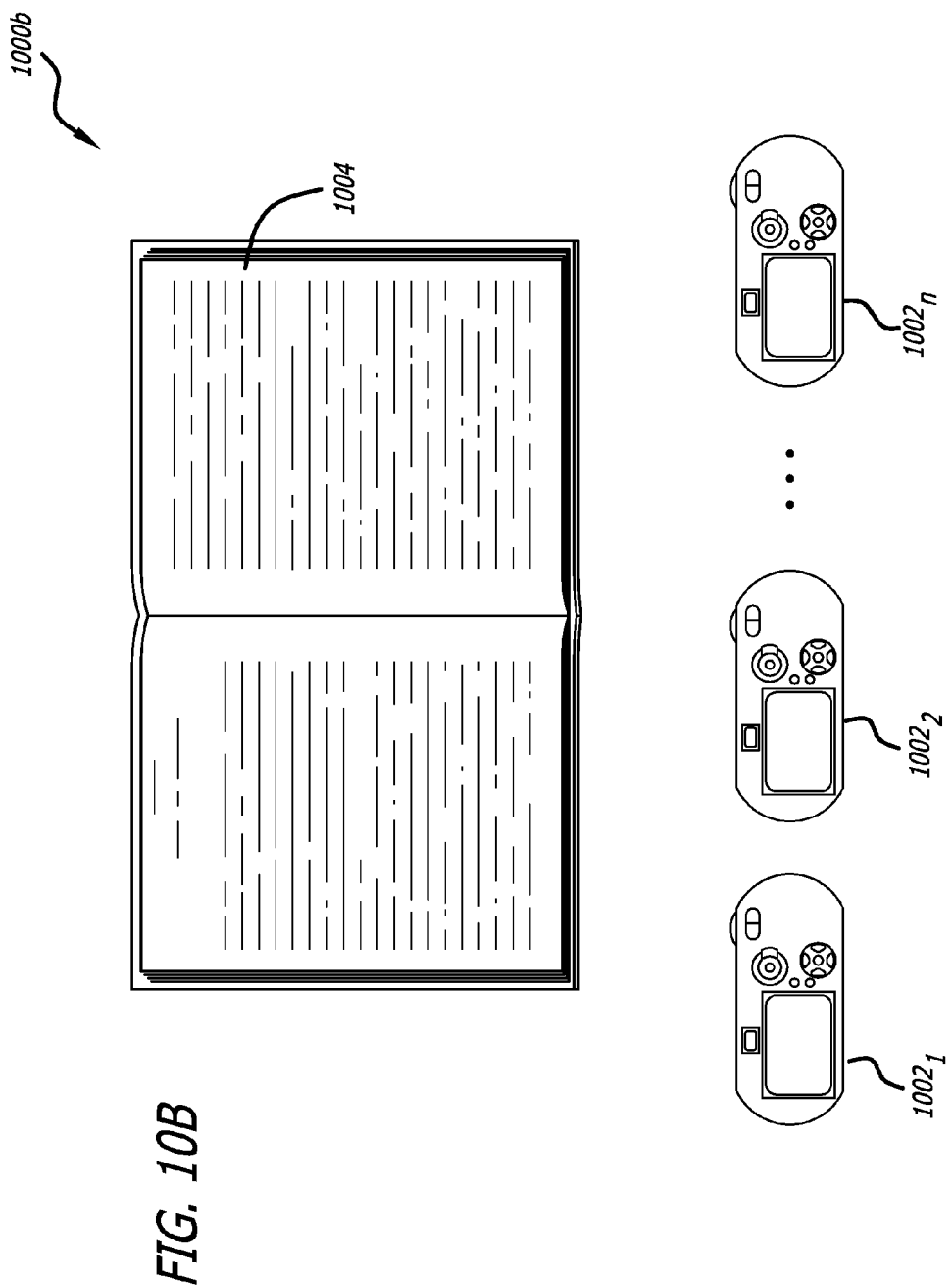
FIG. 10B illustrates an example of a user capturing image information of text from a book using multiple cameras in accordance with at least one embodiment.

FIG. 10A illustrates example 1000*a* of a user capturing image information of text from book 1004 using camera 1002 in accordance with at least one embodiment. As discussed elsewhere herein, multiple image of the text of book 1004 can be captured using camera 1002 and the text from these images can be aggregated or merged to form a text canvas using an algorithm executing on a computing device separate from camera 1002. Accordingly, images from any source can be merged FIG. 10B illustrates an example 1000*b* of image capturing source ($1002_1$, $1002_1$ . . . $1002_1$) composed of multiple cameras capturing image information of text from book 1004 in accordance with at least one embodiment. As discussed elsewhere herein, the images from each of these cameras, such as a camera array, can be merged to generated a text canvas that is larger than any one of these individual cameras can capture in a single image.

Figure 11:
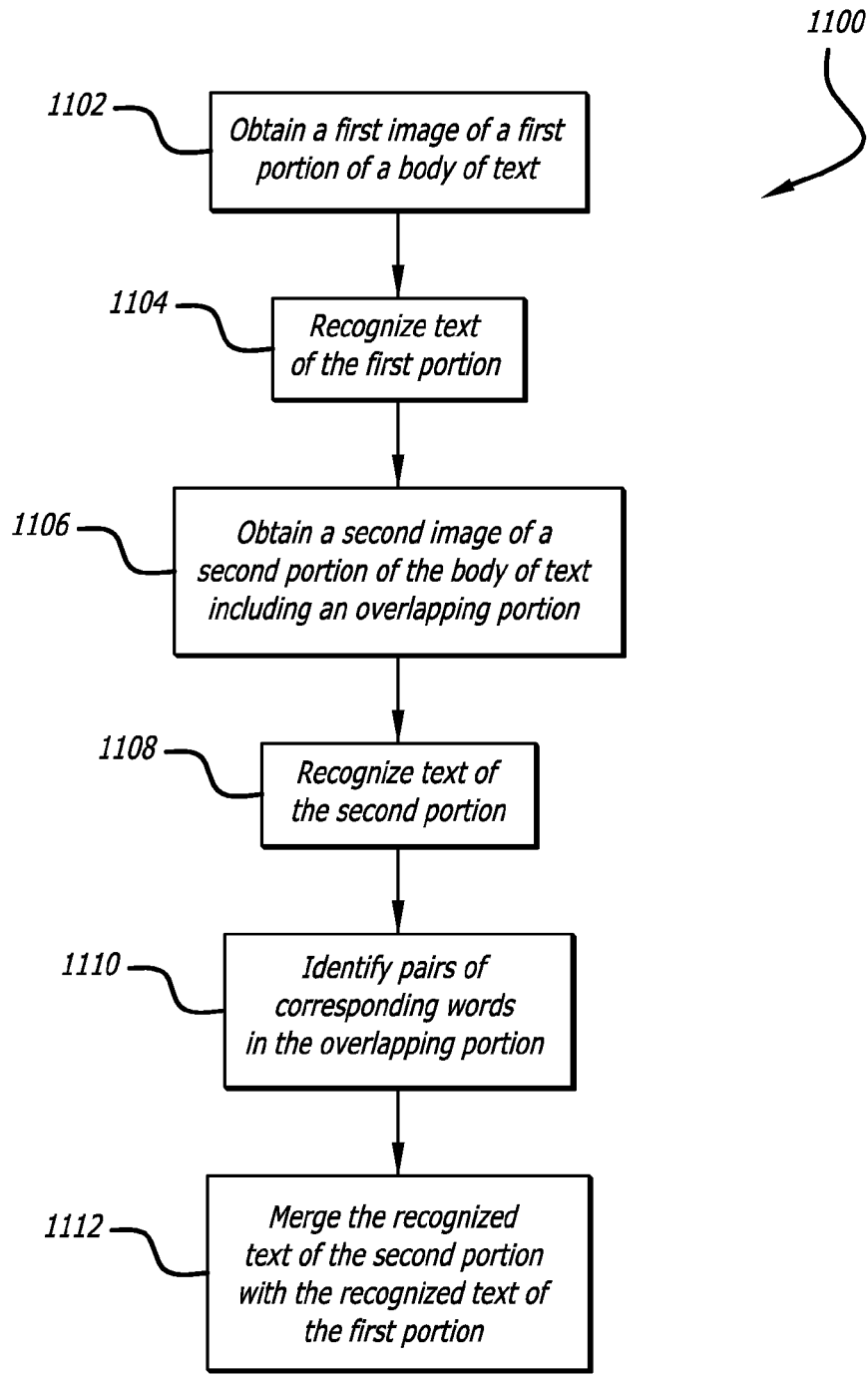
FIG. 11 illustrates another example process for aggregating text in accordance with at least one embodiment.

FIG. 11 illustrates an example process 1100 process for aggregating text that can be used within the scope of various embodiments. In this example, a first image of a first portion of a body of text is obtained by a computing device 1102. As discussed elsewhere herein, the computing device can make use of a frame-to-frame tracking algorithm, which keeps track of mappings between image frames captured by a camera of the computing device over time. This mapping enables the locations of text canvas elements to be updated for a current frame as each new OCR result is obtained.

Accordingly, text of the body of text captured within the first portion is recognized using an OCR engine 1104. In this example, a text canvas is generated using the recognized from the first image if the recognized text does not match any existing text canvas stored either on the computing device or remotely on a server. In this example, a second image of a second portion of the body of text is obtained 1106. The second image, in this example, includes an overlapping portion where the second image partially overlaps the first portion of the first image. The overlapping portion includes words of text that is common to both the first image and the second image.

In this example, text of the body of text captured within the second portion is recognized using an OCR engine 1108. The recognized text from the first image and the recognized text of the second image are then compared to identify pairs of corresponding words in the overlapping portion that appear in each image 1110. Once a threshold number of corresponding pairs has been identified, an algorithm (i.e., RANSAC, etc.) analyzes both the OCR results of the first portion and the second portion to determine a mapping between the same. Accordingly, the recognized text of the second portion is merged with the recognized text of the first portion according to the determined mapping 1112.

Figure 12:
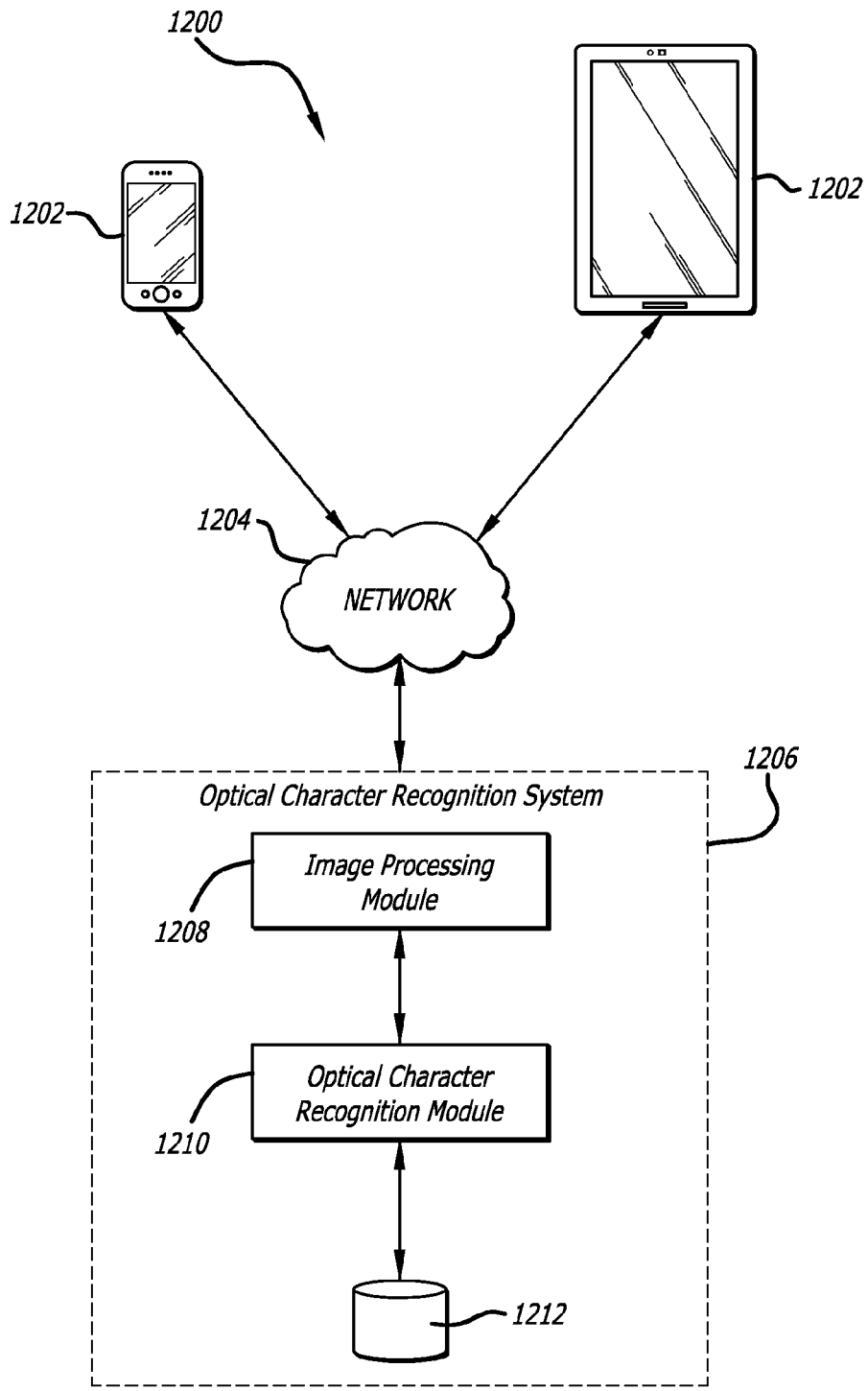
FIG. 12 illustrates an OCR service environment in which various embodiments can be implemented.

FIG. 12 illustrates example environment 1200 in which a user can utilize a computing device to recognize and aggregate text, in accordance with various embodiments. It should be understood that the example system is a general overview of basic components, and that there can be many additional and/or alternative components utilized as known or used in the art for recognizing text in multiple images. Further, example environment 1200 is one of many possible implementation and configurations and at least some of the components shown in FIG. 12 as part of Optical Character Recognition system or service 1206 could also reside on client computing device 1202 and, in one example, all of these components do reside on client computing device 1202.

In this example, a user is able to utilize client computing device 1202, such as a personal computer, tablet computer, smart phone, and the like, to access an Optical Character Recognition system or service 1206 over at least one appropriate network 1204, such as a cellular network, the Internet, or another such network for communicating digital information. Computing device 1202 can capture one or more images (or video) of text and send the images to Optical Character Recognition system or service 1206 over at least one appropriate network 1204. Optical Character Recognition system 1206 includes an image-processing module 1208 that can apply different operators or techniques to pre-process the images before submitting the images to one or more optical character recognition modules 1210. Examples of the operators include a Laplacian-or-Gaussian filter, thresholding filters, and so forth, which enhance or mitigate different characteristics of the images. Examples of these characteristics include intensity, blurriness, and so forth. After pre-processing, the one or more recognition engines of the optical character recognition module 1210 concurrently recognizes text from the image to produce multiple recognized text outputs. In at least one embodiment, a processor can analyze the recognized text using a database 1212 of words in order to improve the recognition. The database 1212 includes a set of words which the processor can search for matches corresponding to words present in the recognized text. At least a portion of these tasks can be performed on a portable computing device or by using at least one resource available across a network as well. In at least some embodiments, an OCR application will be installed on the computing device 1202, such that much of the processing, analyzing, or other such aspects can be executed on the computing device. Various processing steps can be performed by the computing device 1202, by the Optical Character Recognition system 1206, or a combination thereof. Therefore, it should be understood that the components and capabilities of the Optical Character Recognition system 1206 could wholly or partly reside on the computing device 1202.

Figures 13A, 13B:
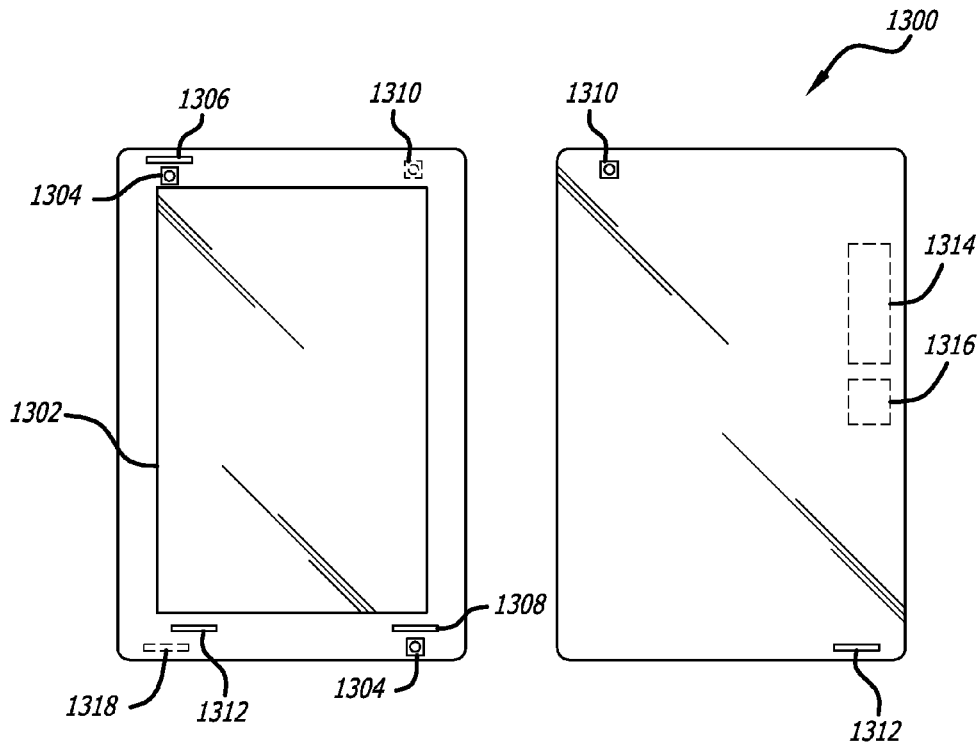
FIGS. 13A and 13B illustrate an example computing device that can be used to implement aspects of various embodiments.

FIGS. 13A and 13B illustrate front and back views, respectively, of an example electronic computing device 1300 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

Computing device 1300 has a display screen 1302 (e.g., an LCD element) operable to display information or image content to one or more users or viewers of the device. The display screen of some embodiments displays information to the uses facing the display screen (e.g., on the same side of the computing device as the display screen). The computing device in this example can include one or more imaging elements, in this example including two image capture elements 1304 on the front of the device and at least one image capture element 1310 on the back of the device. It should be understood, however, that image capture elements could also, or alternatively, be placed on the sides or corners of the device, and that there can be any appropriate number of capture elements of similar or different types. Each image capture element 1304 and 1310 may be, for example, a camera, a charge-coupled element (CCD), a motion detection sensor or an infrared sensor, or other image capturing technology.

As discussed, the device can use the images (e.g., still or video) captured from the imaging elements 1304 and 1310 to generate a three-dimensional simulation of the surrounding environment (e.g., a virtual reality of the surrounding environment for display on the display element of the device). Further, the device can utilize outputs from at least one of the image capture elements 1304 and 1310 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1308 on the front side, one microphone 1312 on the back, and one microphone 1306 on or near a top or side of the device. In some devices there may be only one microphone, while in other devices there might be at least one microphone on each side and/or corner of the device, or in other appropriate locations.

The device 1300 in this example also includes one or more orientation- or position-determining elements 1318 operable to provide information such as a position, direction, motion, or orientation of the device. These elements can include, for example, accelerometers, inertial sensors, electronic gyroscopes, and electronic compasses.

The example device also includes at least one communication mechanism 1314, such as may include at least one wired or wireless component operable to communicate with one or more electronic or computing devices. The device also includes a power system 1316, such as may include a battery operable to be recharged through conventional plug-in approaches, or through other approaches such as capacitive charging through proximity with a power mat or other such element. Various other elements and/or combinations are possible as well within the scope of various embodiments.

Figure 14:
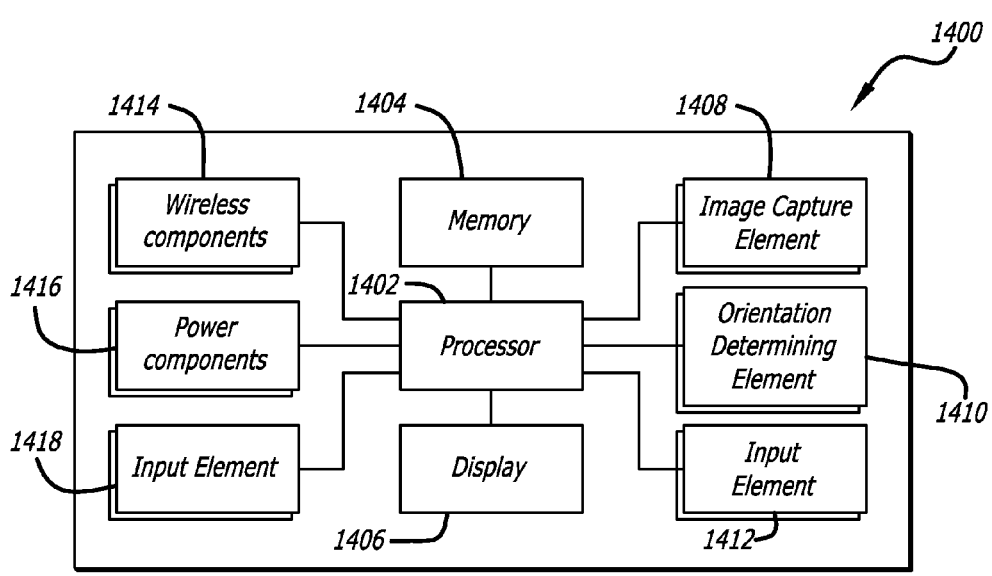
FIG. 14 illustrates example components that can be used with a device such as that illustrated in FIGS. 13A and 13B.

FIG. 14 illustrates a set of basic components of an electronic computing device 1400 such as the device 1300 described with respect to FIG. 13. In this example, the device includes at least one processing unit 1402 for executing instructions that can be stored in a memory element or element 1404. As would be apparent to one of ordinary skill in the art, the device can include many types of memory, data storage, or computer-readable media, such as a first data storage for program instructions for execution by the processing unit(s) 1402, the same or separate storage can be used for images or data, a removable memory can be available for sharing information with other devices, and any number of communication approaches can be available for sharing with other devices.

The device typically will include some type of display element 1406, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1408, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1400 also includes at least one orientation determining element 1410 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1400. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1412 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1414 operable to communicate with one or more electronic or computing devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1416, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include at least one additional input element 1418 able to receive conventional input from a user. This conventional input can include, for example, a push button, touch pad, touch screen, wheel, joystick, keyboard, mouse, keypad, or any other such component or element whereby a user can input a command to the device. These I/O elements could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 15:
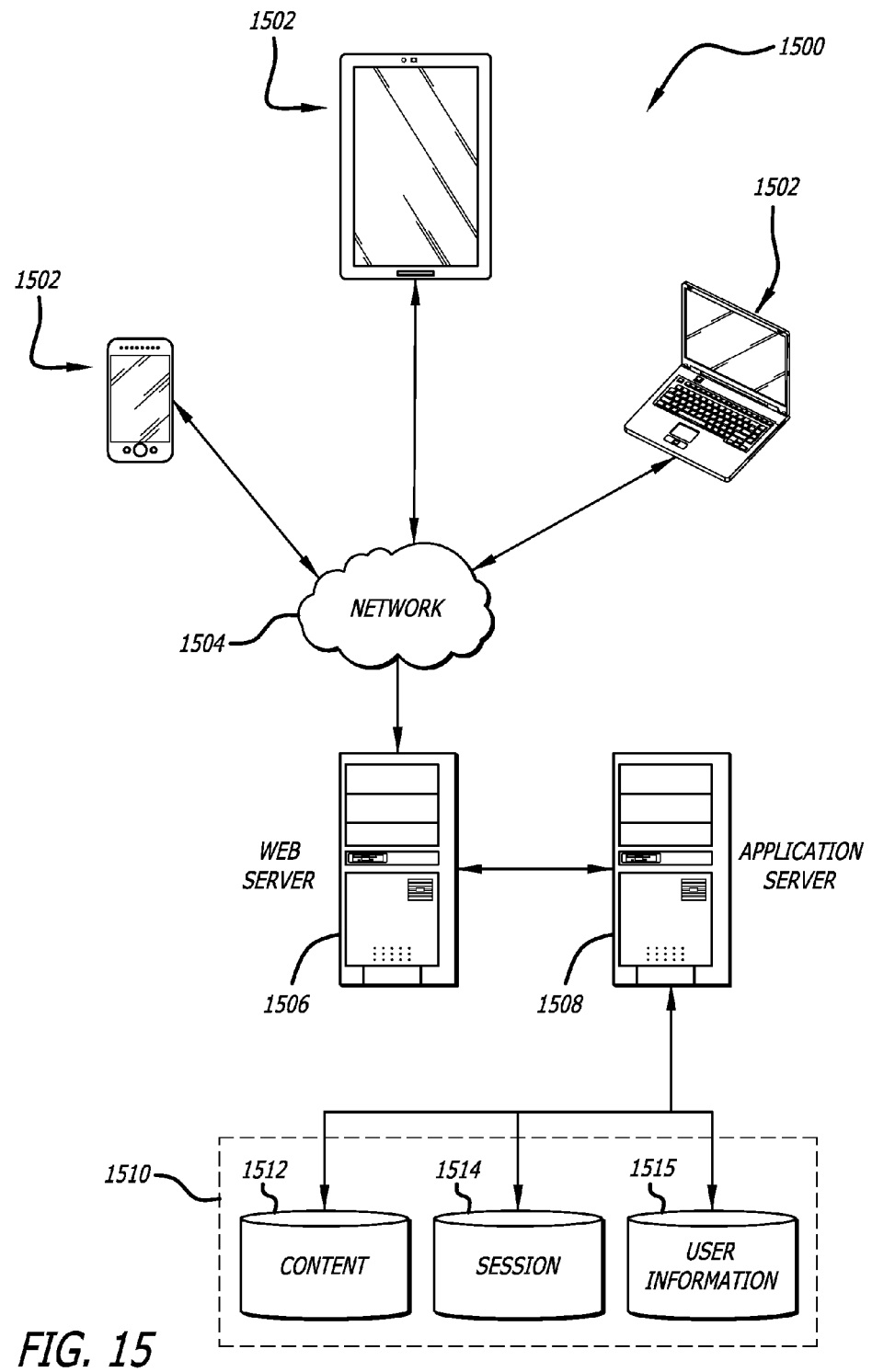
FIG. 15 illustrates an environment in which various embodiments can be implemented.

As discussed, different approaches can be implemented in various environments in accordance with the described embodiments. For example, FIG. 15 illustrates an example of an environment 1500 for implementing aspects in accordance with various embodiments. As will be appreciated, although a Web-based environment is used for purposes of explanation, different environments may be used, as appropriate, to implement various embodiments. The system includes an electronic client device 1502, which can include any appropriate device operable to send and receive requests, messages or information over an appropriate network 1504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1506 for receiving requests and serving content in response thereto, although for other networks, an alternative device serving a similar purpose could be used, as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1506 in the form of HTML, XML or another appropriate structured language in this example. The handling of all requests and responses, as well as the delivery of content between the client device 1502 and the application server 1508, can be handled by the Web server 1506. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing content (e.g., production data) 1512 and user information 1516, which can be used to serve content for the production side. The data store is also shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    a processor;
    a camera;
    a display screen; and
    memory including instructions that, when executed by the processor, cause the computing device to performing a set of operations comprising:
        capture, using the camera, a first image of a first portion of a body of text, at least a portion of the body of text is outside a field of view of the camera;
        recognize, using an optical character recognition (OCR) engine with the first image, text of the first portion of the body of text;
        generate a text canvas using the recognized text of the first portion, the text canvas comprising a plurality of text strings;
        capture, using the camera, a second image of a second portion of the body of text, the second portion partially overlapping the first portion;
        recognize, using the OCR engine with the second image, text of the second portion of the body of text;
        identify pairs of corresponding words in the recognized text of the first portion and the recognized text of the second portion;
        determine a mapping between the recognized text of the first portion and the recognized text of the second portion based at least in part on a geometric correspondence between respective identified pairs of corresponding words;
        merge, based at least in part on the determined mapping, at least a subset of the second portion of the body of text with the text canvas by merging one or more words of the recognized text of the second portion to the text canvas and, as subsequent images are obtained, the text canvas is iteratively updated as new images of the body of text are captured based at least in part on confidence scores; and
        display, on the display screen, the text canvas.

2. The computing device of claim 1, wherein the instructions, when executed by the processor, further enable the computing device to:

capture, using the camera, a third image of a third portion of the body of text;

recognize, using the OCR engine, text of the third portion of the body of text;

identify a second set of pairs of corresponding words in the recognized text of at least one of the first portion or the recognized text of the second portion and the recognized text of the third portion;

determine a mapping between the recognized text of at least one of the first portion or the recognized text of the second portion and the recognized text of the third portion based at least in part on a second geometric correspondence between respective identified pairs of corresponding words; and merge the third portion with the text canvas by merging words of the recognized text of the third portion to the text canvas, the text canvas comprising a set of recognized text corresponding to text from the first portion, the second portion, and the third portion of the body of text captured by the camera.

3. The computing device of claim 1, wherein identifying the pairs of corresponding words in the recognized text of the first portion and the recognized text of the second portion includes:

sorting words of the recognized text of the first portion into a first list;

sorting words of the recognized text of the second portion into a second list; and comparing the sorted first list and the sorted second list to identify the pairs of corresponding words between the sorted first list and the sorted second list.

4. The computing device of claim 1, wherein the instructions, when executed by the processor, further enable the computing device to:

sum string lengths of the identified pairs of corresponding words to calculate a confidence score for the determined mapping.

5. The computing device of claim 1, wherein the instructions, when executed by the processor, further enable the computing device to:

store data for each word appearing in a respective location of the text canvas;

score, for the first image, the second image, and each of at least a subset of subsequently captured images, by summing a number of times each unique word appears in the respective location; and select a word with a highest score for the respective location of the text canvas.

6. The computing device of claim 1, wherein the instructions, when executed by the processor, further enable the computing device to:

store data each word appearing in a respective location of the text canvas;

align, for the first image, the second image, and each of at least a subset of subsequently captured images, characters of each of the words appearing in the respective location;

sum a number of times each unique character appears in a respective character location;

select a character for each respective character location corresponding to the character with a highest unique character sum; and select a word composed of characters with the highest character sum for the respective location of the text canvas.

7. A computer-implemented method, comprising:

obtaining at least one image of a body of text;

recognizing text included in the at least one image;

comparing the recognized text to a set of representations of text corresponding to one or more bodies of text;

identifying a representation of text from among the set of representations of text having at least a portion of text in common with the recognized text of the at least one image, the representation of text composed of a plurality of text strings;

determining a mapping between the recognized text of the at least one image and the representation of text based at least on a geometric correspondence between identified pairs of corresponding text strings in the recognized text of the at least one image and the representation of text; and merging, based at least on the determined mapping, one or more text strings of the recognized text of the at least one image to the representation of text and, as subsequent images are obtained, iteratively updating the representation of text as new images of the body of text are captured based at least in part on confidence scores.

8. The computer-implemented method of claim 7, wherein each text string of the representation of text is associated with a bounding box, wherein each bounding box within the representation of text is aligned to ensure uniform orientation of each text string when the representation of text is updated.

9. The computer-implemented method of claim 7, wherein each text string of the representation of text is associated with a bounding box, wherein confidence scores of text strings associated with bounding boxes located within a threshold distance of an edge of a respective image are penalized.

10. The computer-implemented method of claim 7, wherein the identified pairs of corresponding text strings are determined by:

sorting text strings of the recognized text of the at least one image into a first list;

sorting text strings of the representation of text into a second list; and comparing the sorted first list and the sorted second list to identify the pairs of corresponding text strings.

11. The computer-implemented method of claim 7, further comprising:

storing data for each text string appearing in a respective location of the representation of text;

scoring, for each of at least a subset of subsequent images, each unique text string by summing a number of times each unique text string appears in the respective location; and selecting a text string with a highest score for the respective location of the representation of text.

12. The computer-implemented method of claim 7, further comprising:

summing string lengths of the identified pairs of corresponding text strings to calculate a confidence score for the determined mapping.

13. The computer-implemented method of claim 7, further comprising:

storing data each text string appearing in a respective location of the representation of text;

aligning, for each of at least a subset of subsequent images, characters of each of the text strings appearing in the respective location using a dynamic programming algorithm;

summing a number of times each unique character appears in a respective character location of each text string;

selecting a character for each respective character location corresponding to the character with a highest unique character sum; and selecting a text string composed of characters with the highest character sum for the respective location of the representation of text.

14. A computer-implemented method, comprising:

obtaining a first image of a first portion of a body of text;

recognizing text of the first portion of the body of text in the first image;

obtaining a second image of a second portion of the body of text, the second portion of the body of text including an overlapping portion where the second portion of the body of text partially overlaps the first portion;

recognizing text of the second portion of the body of text in the second image;

identifying, in the overlapping portion, corresponding words in the recognized text of the first portion and the recognized text of the second portion; and merging, based at least in part on the corresponding words in the overlapping portion, the recognized text of the second portion with the recognized text of the first portion to generate a representation of the body of text, the representation of the body of text including a plurality of words and, as subsequent images are obtained, the representation of the body of text is iteratively updated as new images of the body of text are obtained based at least in part on confidence scores.

15. The computer-implemented method of claim 14, wherein the first image and the second image are obtained by a camera of a computing device, and wherein the body of text encompasses an area larger than a field of view of the camera at a maximum distance where the text of the body of text is large enough to be recognized by an optical character recognition (OCR) engine.

16. The computer-implemented method of claim 14, wherein the identified corresponding words are determined by:

sorting, by string length, words of the recognized text of the first portion into a first list;

sorting, by string length, words of the recognized text of the second portion into a second list; and comparing the sorted first list and the sorted second list to identify the corresponding words.

17. The computer-implemented method of claim 14, wherein each word of the representation of text is associated with a bounding box, wherein each bounding box within the representation of text is aligned to ensure uniform orientation of each word when the representation of text is updated.

18. The computer-implemented method of claim 14, wherein each word of the representation of text is associated with a bounding box, wherein confidence scores of words associated with bounding boxes located within a threshold distance of an edge of a respective image are penalized.

* * * * *